US006125303A

United States Patent [19]

Hayama et al.

[11] Patent Number: 6,125,303

[45] Date of Patent: Sep. 26, 2000

[54] STAMP IMAGE FORMING METHOD AND APPARATUS AND STAMP-MAKING APPARATUS

[75] Inventors: Hitoshi Hayama, Nagano; Kenji Watanabe, Tokyo; Takanobu Kameda, Tokyo; Tomoyuki Shimmura, Tokyo, all of Japan

[73] Assignees: Seiko Epson Corporation; King Jim Co., Ltd., both of Tokyo, Japan

[21] Appl. No.: 08/775,079

[22] Filed: Dec. 27, 1996

[30] Foreign Application Priority Data

Dec. 28, 1995 [JP] Japan .................................... 7-341989
Sep. 4, 1996 [JP] Japan .................................... 8-253948

[51] Int. Cl.[7] ...................................................... G06F 19/00

[52] U.S. Cl. ................................................ 700/117; 430/5

[58] Field of Search .............................. 358/299; 400/61, 400/615.2, 83; 250/492.1; 430/5; 355/18; 101/35; 700/119, 95, 117, 121

[56] References Cited

U.S. PATENT DOCUMENTS 5,644,136 7/1997 Kameda et al. ..................... 250/492.1
5,868,504 2/1999 Nunokawa et al. ...................... 400/61
5,892,589 4/1999 Beckett et al. .......................... 358/299

*Primary Examiner*—William Grant
*Assistant Examiner*—Steven R. Garland
*Attorney, Agent, or Firm*—Hogan & Hartson, LLP

[57] ABSTRACT

A stamp image forming method and apparatus and a stamp-making apparatus using same are provided. Previously stored relief data represents an image of a stamp of interest in the form of positive dots corresponding to protrusions and blank portions of the image in the form of negative dots corresponding to recesses. The relief data is read to generate intaglio data representing the image in the form of negative dots and the blank portions in the form of positive dots based on the relief data. In place of the relief data, relief basic data may be stored which represents an image of a stamp of interest in the form of positive dots corresponding to protrusions and blank portions of the image in the form of negative dots corresponding to recesses. The relief basic data is read, and a positive dot group comprising the positive dots in the relief basic data is extended to generate relief data representing an emphasized image, including the image formed of an extended positive dot group, in the form of positive dots and representing the remaining blank portions in the form of negative dots. Intaglio data representing the emphasized image in the form of negative dots and representing the remaining blank portions in the form of positive dots is generated based on the relief data.

28 Claims, 27 Drawing Sheets

SQUARE STAMP (SMALL)
A
263
263(Ah)

SQUARE STAMP (LARGE)
A
263
263(Ah)

PERSONAL NAME STAMP
A
263(Ah)

BUSINESS STAMP (SMALL)
A
263(Ah)

BUSINESS STAMP (LARGE)
A
263
263(Ah)

ADDRESS STAMP
A
263(Ah)

MAXIMUM SIZE STAMP
A
263
263(Ah)

STAMP IMAGE FORMING METHOD AND APPARATUS AND STAMP-MAKING APPARATUS

BACKGROUND OF THE INVENTION

1. Field of the Invention

The present invention relates generally to fabrication of stamps, and more particularly to a stamp image forming method and apparatus and a stamp-making apparatus.

2. Description of the Related Art

An image for a stamp is generally formed by relief engraving or intaglio engraving. The relief engraving represents a stamp image of interest in the form of positive dots corresponding to protrusions and blank portions in the stamp in the form of negative dots corresponding to recesses. Therefore, if a single dot matrix data is prepared for an image, dots in the matrix data may be thinned for forming the same image in a reduced size. In addition, when other images are to be combined with the image, dot matrix data representing these images may be simply arranged together to generate combined dot matrix data as desired.

Thus, when dot matrix data are prepared for generally employed images as standard data, a stamp having a desired relief can be readily made.

On the other hand, the intaglio engraving regards blank portions other than a stamp image of interest as images for plate making, and represents the blank portions in the form of positive dots as is the case of the relief engraving for representing an image. For this reason, dot matrix data comprising an intaglio frame and so on must be prepared for individual images in consideration of difference in the shape and size of a stamp itself and an intaglio frame, an image of interest to be engraved, a combination thereof, and so on. In addition, these components essentially depend on the tastes of individual users. It is therefore practically impossible to prepare all combinations of such components as standard data for making intaglio stamps.

Moreover, in intaglio engraving, unlike the relief engraving, recesses corresponding to extremely thin lines of an image are quite difficult to incise into a stamp surface. In other words, since it is difficult to incise such recesses in a sufficient depth, the recesses tend to be shallow. For this reason, when a stamp having an image formed of such thin lines is affixed, ink or the like in such shallow recesses may attach on an affixed surface so that the lines of the affixed image become thinner. Particularly, a stamp surface of a stamp body made of a flexible material, on which an intaglio is engraved is problematic in that protrusions corresponding to blanks other than an image of a stamp may extend to reduce the width of lines of the image as the stamp is affixed. Disadvantageously, the thinned lines would cause the affixed images to appear poor.

SUMMARY OF THE INVENTION

It is a first object of the present invention to provide a method of forming a stamp image which is capable of readily making a stamp having a desired intaglio without preparing a variety of individual data for forming intaglio images.

It is a second object of the present invention to provide a stamp image forming apparatus which is capable of readily making a stamp having a desired intaglio image without preparing a variety of individual data for forming intaglios.

It is a third object of the present invention to provide a stamp-making apparatus which is capable of making a good-looking intaglio using the stamp image creating method and apparatus.

To achieve the first object, according to a first embodiment of the present invention, there is provided a method of forming a stamp image comprising a relief data storing step of storing relief data representing an image of a stamp of interest in the form of positive dots corresponding to protrusions and representing blank portions of the image in the form of negative dots corresponding to recesses, and an intaglio data generating step of reading the relief data, and generating intaglio data representing the image in the form of negative dots and the blank portions in the form of positive dots based on the relief data.

To achieve the second object, according to a second embodiment of the present invention, there is provided a stamp image forming apparatus comprising relief data storing means for storing relief data representing an image of a stamp of interest in the form of positive dots corresponding to protrusions and representing blank portions of the image in the form of negative dots corresponding to recesses, and intaglio data generating means for reading the relief data, and generating intaglio data representing the image in the form of negative dots and the blank portions in the form of positive dots based on the relief data.

In the stamp image forming method according to the first embodiment and the stamp image forming apparatus according to the second embodiment of the present invention, since intaglio data for forming an intaglio is generated based on relief data serving as standard data, it is not necessary to prepare a variety of individual data for forming intaglios. More specifically, relief data including a desired image or a combination of images is generated for plate making using standard data for respective relief images by the same method as that conventionally used for forming a relief, and intaglio data is generated based on the relief data, so that a desired intaglio image can be readily formed.

To achieve the first object, according to a third embodiment of the present invention, there is provided a method of forming a stamp image comprising a relief basic data storing step of storing relief basic data representing an image of a stamp of interest in the form of positive dots corresponding to protrusions and representing blank portions of the image in the form of negative dots corresponding to recesses, a relief data emphasizing step of reading the relief basic data and extending a positive dot group comprising the positive dots in the relief basic data to generate relief data representing an emphasized image in the form of positive dots and representing the remaining blank portions in the form of negative dots, the emphasized image including the image formed of an extended positive dot group, and an intaglio data generating step of generating intaglio data representing the emphasized image in the form of negative dots and representing the remaining blank portions in the form of positive dots.

To achieve the second object, according to a fourth embodiment of the present invention, there is provided a stamp image forming apparatus comprising relief basic data storing means for storing relief basic data representing an image of a stamp of interest in the form of positive dots corresponding to protrusions and representing blank portions of the image in the form of negative dots corresponding to recesses, relief data emphasizing means for reading the relief basic data and extending a positive dot group comprising the positive dots in the relief basic data to generate relief data representing an emphasized image in the form of positive dots and representing the remaining blank portions in the form of negative dots, the emphasized image including the image formed of an extended positive dot group, and intaglio data generating means for generating intaglio data representing the emphasized image in the form of negative dots and representing the remaining blank portions in the form of positive dots.

As mentioned above as one of the problems encountered in the prior art, when an intaglio is formed on a stamp-making area made of a flexible material, or when an image formed of thin lines is engraved for making an intaglio stamp, an affixed stamp tends to be poor. In the stamp image forming method according to the third embodiment and the stamp image forming apparatus according to the fourth embodiment of the present invention, the above-mentioned disadvantage is overcome by extending a positive dot group corresponding to protrusions in relief basic data serving as standard data to generate relief data which represents an emphasized image in the form of positive dots. The emphasized image is formed of fatter lines than an original image represented by the relief basic data, i.e., it has an emphasized stamp image. In this way, it is possible to extend a negative dot group corresponding to recesses in intaglio data for forming an intaglio, generated based on the relief data. It is therefore appreciated that the stamp image forming method and apparatus according to the third and fourth embodiments are advantageous in eliminating the need for preparing a variety of data for forming individual intaglios as well as in forming a good-looking intaglio for a stamp which will provide a good-looking and profound image when affixed. In this event, the relief data generated as described above may be stored as new standard data for extending its utilization area to a wide variety of applications.

Preferably, in the stamp image forming method according to the first and third embodiments, the intaglio data generating step includes an inverted logical data generating step of inverting the relationship between the positive dot and the negative dot for each of the dots in the relief data to generate intaglio basic data, a stamp outline data storing step of storing stamp outline data representing an inner portion surrounded by an outline of a stamp-making area of a stamp body in the form of positive dots and representing a portion outside of the outline in the form of negative dots, and an outline logical AND data generating step of reading the stamp outline data, taking a logical AND of mutually corresponding dots of the intaglio basic data and the stamp outline data, and generating the intaglio data comprising, as its elements, respective bits derived by the logical AND operation.

Preferably, likewise in the stamp image forming apparatus according to the second and fourth embodiments, the intaglio data generating means includes inverted logical data generating means for inverting the relationship between the positive dot and the negative dot for each of the dots in the relief data to generate intaglio basic data, stamp outline data storing means for storing stamp outline data representing an inner portion surrounded by an outline of a stamp-making area of a stamp body in the form of positive dots and representing a portion outside of the outline in the form of negative dots, and outline logical AND data generating means for reading the stamp outline data, taking a logical AND of mutually corresponding dots of the intaglio basic data and the stamp outline data, and generating the intaglio data comprising, as its elements, respective bits derived by the logical AND operation.

According to the preferred embodiments mentioned above, even for a stamp having a stamp-making area of a stamp body in a particular shape, for example, a square stamp and so on, positive dots outside of the outline of the stamp can be deleted by taking a logical AND of the intaglio basic data generated based on the relief data and the stamp outline data representing the stamp outline, thus making it possible to generate a stamp image which never overflows the stamp-making area.

Preferably, in the stamp image forming methods according to the first and third embodiments, the intaglio data generating step includes an inverted logical data generating step of inverting the relationship between the positive dot and the negative dot for each of the dots in the relief data to generate inverted logical data, an intaglio frame outline data storing step of storing intaglio frame outline data representing an intaglio frame and a portion inside thereof in the form of positive dots and representing a portion outside of the intaglio frame in the form of negative dots, and a frame logical AND data generating step of reading the intaglio frame outline data, taking a logical AND of mutually corresponding dots of the inverted logical data and the intaglio frame outline data, and generating the intaglio data comprising, as its elements, respective bits derived by the logical AND operation.

Preferably, likewise in the stamp image forming apparatus according to the second and fourth embodiments, the intaglio data generating means includes inverted logical data generating means for inverting the relationship between the positive dot and the negative dot for each of the dots in the relief data to generate inverted logical data, intaglio frame outline data storing means for storing intaglio frame outline data representing an intaglio frame and a portion inside thereof in the form of positive dots and representing a portion outside of the intaglio frame in the form of negative dots, and frame logical AND data generating means for reading the intaglio frame outline data, taking a logical AND of mutually corresponding dots of the inverted logical data and the intaglio frame outline data, and generating the intaglio data comprising, as its elements, respective bits derived by the logical AND operation.

According to the preferred embodiments mentioned above, for example, if an intaglio is desired in a particular portion of a stamp-making area, a stamp image for the intaglio portion can be generated by first creating a shape including a frame of the intaglio and a portion inside thereof, i.e., intaglio frame outline data having the outline of the entire intaglio, and then combining the intaglio frame outline data with relief data. In this event, since a logical AND of an inverted version of the relief data and the intaglio frame outline data is taken, a portion overflowing from the frame of the intaglio can be deleted even if the size of a character or the like is found extremely large when a stamp image is formed, thus making it possible to evenly distribute characters and so on, which are discernible even if a portion thereof is deleted, over the entire area to the proximity of the frame. In this way, an impressive and profound intaglio can be formed.

Preferably, in the stamp image forming method according to the first and third embodiments, the intaglio data generating step includes an intaglio frame data storing step of storing intaglio frame data representing information on an intaglio frame having a predetermined width in the form of positive dots and representing a portion inside of the intaglio frame in the form of negative dots, a logical exclusive-OR data generating step of reading the intaglio frame data, taking a logical exclusive-OR of mutually corresponding dots of the relief data and the intaglio frame data, and generating logical exclusive-OR data comprising, as its elements, respective bits derived by the logical exclusive- OR operation, and an inside data inverting step of inverting the relationship between the positive dot and the negative dot for each of dots corresponding to the portion inside of the intaglio frame of the logical exclusive-OR data.

Preferably, likewise in the stamp image forming apparatus according to the second and fourth embodiments, the intaglio data generating means includes intaglio frame data storing means for storing intaglio frame data representing information on an intaglio frame having a predetermined width in the form of positive dots and representing a portion inside of the intaglio frame in the form of negative dots, logical exclusive-OR data generating means for reading the intaglio frame data, taking a logical exclusive-OR of mutually corresponding dots of the relief data and the intaglio frame data, and generating logical exclusive-OR data comprising, as its elements, respective bits derived by the logical exclusive-OR operation, and inside data inverting means for inverting the relationship between the positive dot and the negative dot for each of the dots corresponding to the portion inside of the intaglio frame of the logical exclusive-OR data.

According to the preferred embodiments mentioned above, for example, when an intaglio is desired in a particular portion of a stamp-making area, a frame may be set for the intaglio and generated as intaglio frame data, such that the intaglio frame data is combined with relief data to generate a stamp image for the intaglio portion. In this event, since the relief data and the intaglio frame data are not combined by a logical OR but by a logical exclusive-OR, overlapped portions of both the data remain as negative dots, thus making it possible to prevent part of a desired image from being overwritten by the frame.

Preferably, in the stamp image forming method according to the first and third embodiments, the intaglio data generating step includes an inverted logical data generating step of inverting the relationship between the positive dot and the negative dot for each of dots in the relief data, an intaglio frame outline data storing step of storing intaglio frame outline data representing an intaglio frame and a portion inside thereof in the form of positive dots and representing a portion outside of the intaglio frame in the form of negative dots, a frame logical AND data generating step of reading the intaglio frame outline data, taking a logical AND of mutually corresponding dots of the inverted logical data and the intaglio frame outline data, and generating the intaglio basic data comprising, as its elements, respective dots derived by the logical AND operation, a stamp outline data storing step of storing stamp outline data representing an inner portion surrounded by an outline of a stamp-making area of a stamp body in the form of positive dots and representing a portion outside of the outline in the form of negative dot, and an outline logical AND data generating step of reading the stamp outline data, taking a logical AND of mutually corresponding dots of the intaglio basic data and the stamp outline data, and generating the intaglio data comprising, as its elements, respective bits derived by the logical AND operation.

Preferably, likewise in the stamp image forming apparatus according to the second and fourth embodiments, the intaglio data generating means includes inverted logical data generating means for inverting the relationship between the positive dot and the negative dot for each of dots in the relief data, intaglio frame outline data storing means for storing intaglio frame outline data representing an intaglio frame and a portion inside thereof in the form of positive dots and representing a portion outside of the intaglio frame in the form of negative dots, frame logical AND data generating means for reading the intaglio frame outline data, taking a logical AND of mutually corresponding dots of the inverted logical data and the intaglio frame outline data, and generating the intaglio basic data comprising, as its elements, respective dots derived by the logical AND operation, stamp outline data storing means for storing stamp outline data representing an inner portion surrounded by an outline of a stamp-making area of a stamp body in the form of positive dots and representing a portion outside of the outline in the form of negative dots, and outline logical AND data generating means for reading the stamp outline data, taking a logical AND of mutually corresponding dots of the intaglio basic data and the stamp outline data, and generating the intaglio data comprising, as its elements, respective bits derived by the logical AND operation.

According to the preferred embodiments mentioned above, since the stamp image data is generated using the stamp outline data and the intaglio frame data, the resulting stamp can have advantages of both the data. Specifically, when a stamp has a stamp-making area in a particular form, or when an intaglio is desired in a particular portion of a stamp-making area, a stamp image partially including an intaglio can be formed while preventing the intaglio from overflowing from the stamp-making area.

Preferably, in the stamp image forming method according to the first and third embodiments, the intaglio data generating step includes an intaglio frame data storing step of storing intaglio frame data representing information on an intaglio frame having a predetermined width in the form of positive dots and representing a portion inside of the intaglio frame in the form of negative dots, a logical exclusive-OR data generating step of reading the intaglio frame data, taking a logical exclusive-OR of mutually corresponding dots of the relief data and the intaglio frame data, and generating logical exclusive-OR data comprising, as its elements, respective bits derived by the logical exclusive-OR operation, an inside data inverting step of inverting the relationship between the positive dot and the negative dot for each of dots corresponding to the portion inside of the intaglio frame of the logical exclusive-OR data, a stamp outline data storing step of storing stamp outline data representing an inner portion surrounded by an outline of a stamp-making area of a stamp body in the form of positive dots and representing a portion outside of the outline in the form of negative dots, and an outline logical AND data generating step of reading the stamp outline data, taking a logical AND of mutually corresponding dots of the intaglio basic data and the stamp outline data, and generating the intaglio data comprising, as its elements, respective bits derived by the logical AND operation.

Preferably, likewise in the stamp image forming apparatus according to the second and fourth embodiments, the intaglio data generating means includes an intaglio frame data storing means for storing intaglio frame data representing information on an intaglio frame having a predetermined width in the form of positive dots and representing a portion inside of the intaglio frame in the form of negative dots, a logical exclusive-OR data generating means for reading the intaglio frame data, taking a logical exclusive-OR of mutually corresponding dots of the relief data and the intaglio frame data, and generating logical exclusive-OR data comprising, as its elements, respective bits derived by the logical exclusive-OR operation, inside data inverting means for inverting the relationship between the positive dot and the negative dot for each of the dots corresponding to the portion inside of the intaglio frame of the logical exclusive-OR data, stamp outline data storing means for storing stamp outline data representing an inner portion surrounded by an outline of a stamp-making area of a stamp body in the form of positive dots and representing a portion outside of the outline in the form of negative dots, and outline logical AND data generating means for reading the stamp outline data, taking a logical AND of mutually corresponding dots of the intaglio basic data and the stamp outline data, and generating the intaglio data comprising, as its elements, respective bits derived by the logical AND operation.

According to the preferred embodiments mentioned above, since the stamp image data is generated using the stamp outline data and the intaglio frame data, the resulting stamp can have advantages of both the data. Specifically, when a stamp has a stamp-making area in a particular form, or when an intaglio is desired in a particular portion of a stamp-making area, a stamp image partially including an intaglio can be formed while preventing the intaglio from overflowing from the stamp-making area.

To achieve the third object, according to a fifth embodiment of the present invention, there is provide a stamp-making apparatus for making a stamp, the stamp making apparatus having an apparatus body in which a stamp body is removably loaded, the stamp body having a stamp-making area on which a stamp image is engraved, the stamp-making apparatus comprising a stamp image forming apparatus comprising relief data storing means for storing relief data representing an image of a stamp of interest in the form of positive dots corresponding to protrusions and representing blank portions of the image in the form of negative dots corresponding to recesses, and intaglio data generating means for reading the relief data, and generating intaglio data representing the image in the form of negative dots and the blank portions in the form of positive dots based on the relief data, and stamp-making means for engraving an intaglio on a stamp-making area of a stamp body removably loaded in the apparatus body based on the intaglio data generated by the stamp image forming apparatus.

To achieve the third object, according to the sixth embodiment of the present invention, there is provided a stamp-making apparatus for making a stamp, the stamp making apparatus having an apparatus body in which a stamp body is removably loaded, the stamp body having a stamp-making area on which a stamp image is engraved, the stamp-making apparatus comprising a stamp image forming apparatus comprising relief basic data storing means for storing relief basic data representing an image of a stamp of interest in the form of positive dots corresponding to protrusions and representing blank portions of the image in the form of negative dots corresponding to recesses, relief data emphasizing means for reading the relief basic data and extending a positive dot group comprising the positive dots in the relief basic data to generate relief data representing an emphasized image in the form of positive dots and representing the remaining blank portions in the form of negative dots, the emphasized image including the image formed of an extended positive dot group, and intaglio data generating means for generating intaglio data representing the emphasized image in the form of negative dots and representing the remaining blank portions in the form of positive dots, and stamp-making means for engraving an intaglio on a stamp-making area of a stamp body removably loaded in the apparatus body based on the intaglio data generated by the stamp image forming apparatus.

In the stamp-making apparatus according to the fifth and sixth embodiments of the present invention, the stamp-making means for engraving an intaglio on a stamp-making area of a stamp body based on the intaglio data enables a stamp having a desired intaglio to be readily made, making the most of advantages provided by the aforementioned stamp image forming apparatuses described in claims 8 and 14 described above, i.e., the advantages including the elimination of the need for preparing individual data for forming intaglios.

Preferably, the stamp-making area of the stamp body is made of a light-sensitive resin, and the stamp-making means includes exposure time storing means for storing a plurality of exposure times, exposure time selecting means for selecting an extended exposure time for extending recesses corresponding to a negative dot group comprising the negative dots in the intaglio data from the plurality of exposure times, and exposing means for engraving an intaglio on the stamp-making area of the stamp body by an exposure in accordance with the extended exposure time.

When an ultraviolet-curing resin, for example, is used as a light-sensitive resin constituting the stamp-making area, blank portions other than an intaglio image, i.e., portions of the stamp-making area to be formed with protrusions of the intaglio are exposed to ultraviolet rays for curing, while the remaining portions, i.e., recesses representing the intaglio image are washed out to form the intaglio. In this event, as the exposure time is shorter, uncured portions are increased, with the result that the recesses of the intaglio image are extended. With a thermoplastic resin or the like which is softened by exposure, on the contrary, portions corresponding to an intaglio image are exposed. As an exposure time for this process is longer, recesses representing the intaglio image are extended. According to this stamp-making apparatus, a longer exposure time is selected for extending recesses of an intaglio from a plurality of exposure times to form the intaglio by an exposure in accordance with the selected exposure time, thus making it possible to readily form an intaglio having wider recesses, i.e., a good-looking intaglio emphasized by the extended recesses.

The above and other objects, features, and advantages of the present invention will become more apparent from the following detailed description of the preferred embodiment taken in conjunction with the accompanying drawings.

DESCRIPTION OF THE PREFERRED EMBODIMENTS

The present invention will hereinafter be described with reference to the accompanying drawings.

Figure 1A:
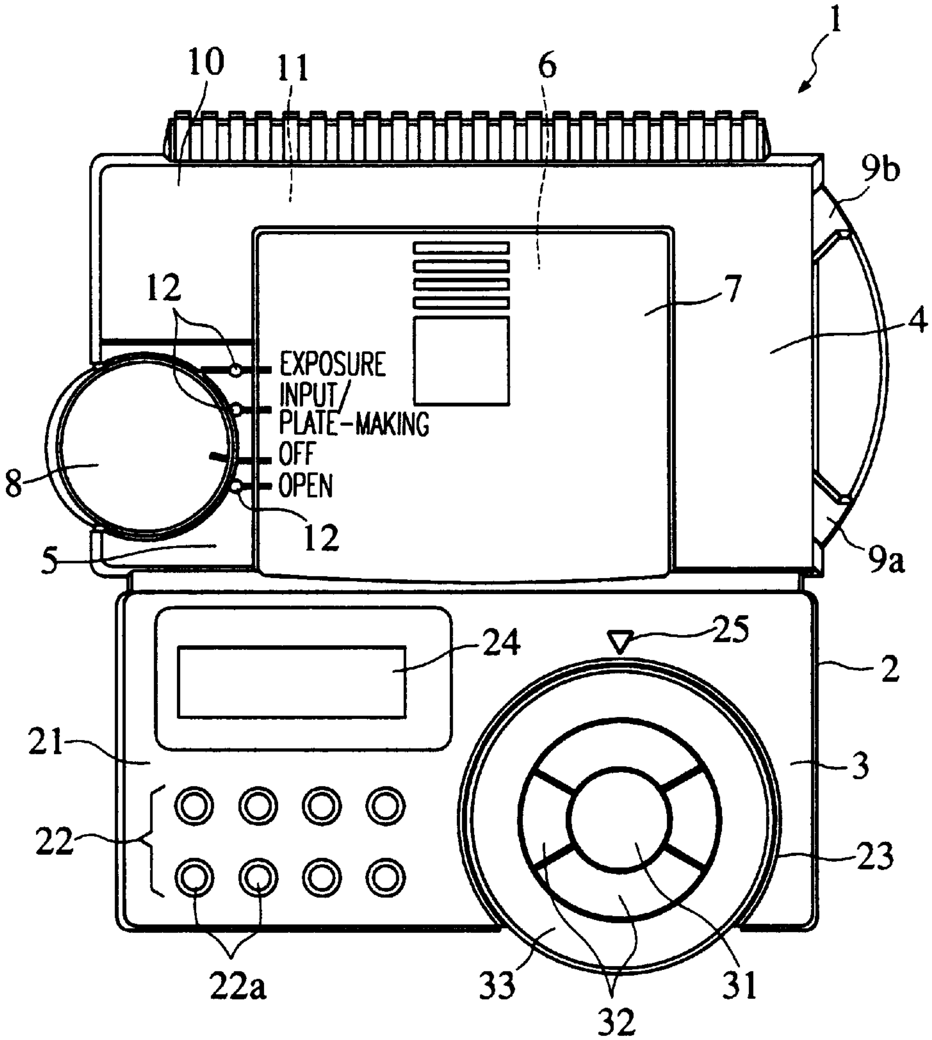
FIG. 1A is a plan view illustrating an appearance of a stamp-making apparatus to which are applied a stamp image forming method and apparatus according to embodiments of the invention.
Figure 1B:
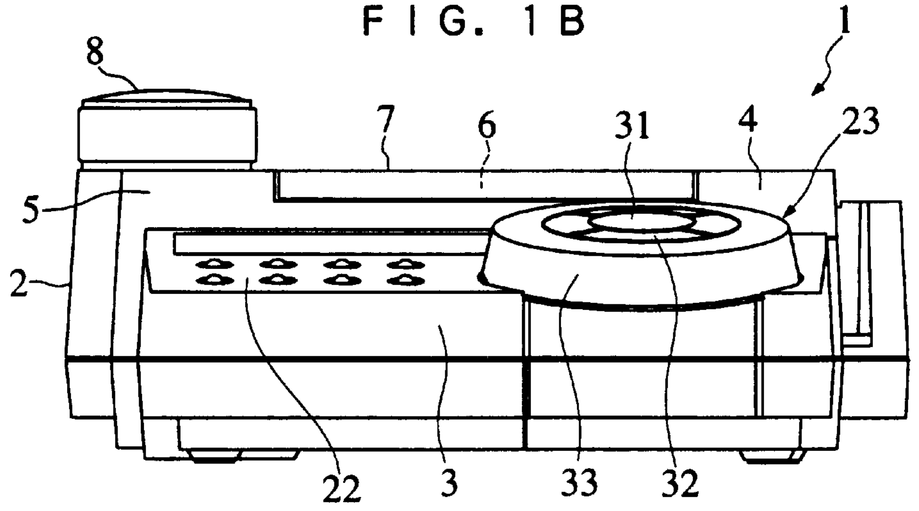
FIG. 1B is a front view illustrating an appearance of the stamp-making apparatus.
Figure 11:
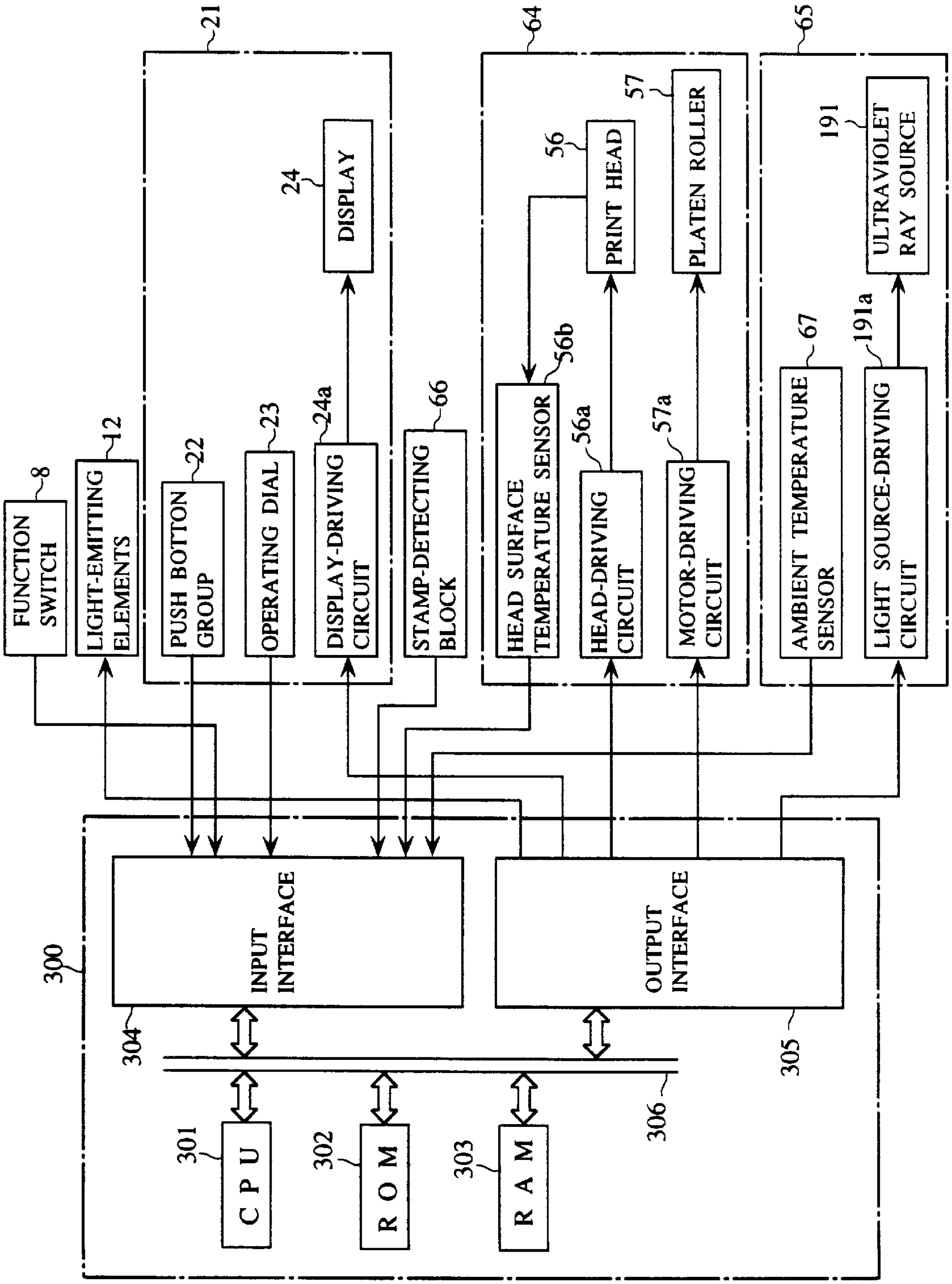
FIG. 11 is a block diagram of a control block and devices connected thereto of the stamp-making apparatus.

FIGS. 1A and 1B illustrate a stamp-making apparatus 1 to which are applied the stamp image forming method and apparatus according to embodiments of the present invention. The stamp-making apparatus makes a desired stamp by exposing a stamp body having a stamp surface formed of an ultraviolet curing resin to ultraviolet rays via a mask made of an ink ribbon on which stamp characters (images to be stamped including a pictorial pattern) are printed. The stamp image forming method and apparatus are directed to generate stamp image data which serves as information for fabricating such a mask on the ink ribbon. FIGS. 1A and 1B illustrate the stamp-making apparatus in a plan view and in a front view, respectively. FIG. 11 is a block diagram illustrating a control system of the apparatus.

As illustrated in FIGS. 1A and 1B, the stamp-making apparatus 1 includes a casing 2 having upper and lower divisional portions, an electronic block 3 arranged in a front part of the casing 2, and a mechanical block 4 arranged in a rear part of the same. The mechanical block 4 is comprised of a mechanical block body 5, a pocket 6 formed in a central area of the mechanical block for receiving therein a stamp body A as a stamp-making object material to mount the stamp body A in the mechanical block body 5, and a lid 7 for opening and closing the pocket 6, which is formed with a window. In a left side portion of the mechanical block 4 as viewed in the figures, a function switch 8 is provided for switching the operation of the stamp-making apparatus 1 between plate-making (printing) and exposure, as well as for permitting the lid 7 to be opened. Information of each switching operation of the function switch 8 is sent to an input interface 304 of a control block 300, later described, while indications of “EXPOSURE”, “INPUT/PLATE-MAKING”, “OFF” and “OPEN” are provided at respective operating positions. At the operating positions of “EXPOSURE”, “INPUT/PLATE-MAKING”, and “OPEN”, there are provided respective light-emitting elements 12 connected to an output interface 305 of the control block 300. Further, in a right side portion of the mechanical block 4, there are formed an inserting slot 9*a* for feeding a plate-making sheet B from which is made a stamp character label, later described, and a take-out slot 9*b* for delivering the plate-making sheet B therefrom. Further, the mechanical block 4 has a maintenance cover 10 removably mounted on part thereof outside the pocket 6, and an ink ribbon cartridge 11 carrying an ink ribbon C is mounted under the maintenance cover 10.

The electronic block 3 has an operating block 21 formed on the top thereof and contains the control block 300 therein. The operating block 21 includes a push button group 22 and an operating dial 23 both connected to the input interface 304 of the control block 300, and an indicator-driving circuit (see FIG. 11) connected to the output interface 305 of the control block 300 and an indicator 24 driven by the indicator-driving circuit 24*a*. The operating dial 23 has a triad structure including an execution key 31 having a circular shape and arranged in the center, a cursor/conversion key 32 having four divisional blocks arranged along the outer periphery of the execution key 31 to form an annular shape, and a character input key 33 having an annular shape and arranged along the outer periphery of the cursor/conversion key 32. On the surface of the character input key 33, hirakana characters representative of the Japanese syllabary, not shown, etc. are printed. Stamp characters are input by first determining a character size by pushing a predetermined button 22*a* of the push button group 22, turning the character input key 33 to set each of desired hirakana characters to a triangle mark 25, and pushing the execution key 31 whenever each of the desired hirakana characters is set to the triangle mark 25, followed by converting desired ones of the input hirakana characters to kanji characters by operating the cursor/conversion key 32. When desired stamp characters are formed on the display 24, they are settled.

Figure 2:
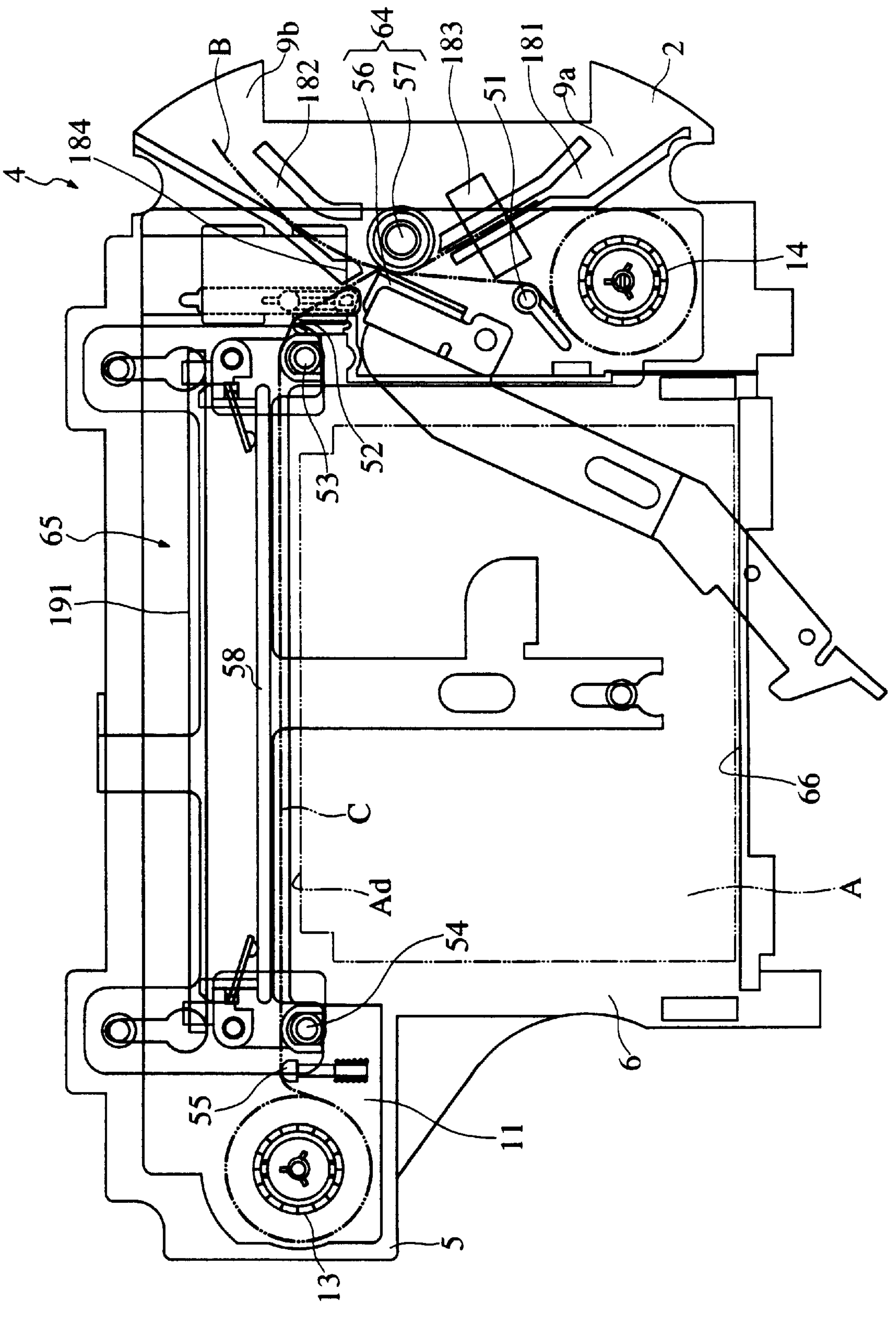
FIG. 2 is a plan view of an internal construction of a mechanical block of the stamp-making apparatus.

Now, a sequence of operations for making a stamp will be briefly described with reference to FIGS. 1A and 1B, and 2. First, the function switch 8 is rotated from "OFF" position as a standby position to "OPEN" position to open the lid 7, and a stamp body A is set in the pocket 6. As the stamp body A is set, the type of the stamp body A is detected by a stamp-detecting block 66 connected to the input interface 304 of the control block 300.

Then, the function switch 8 is rotated to "INPUT/PLATE-MAKING POSITION" to switch the function of the apparatus to plate-making, and the push button group 22 and the operating dial 23 are operated to input stamp characters. When the inputting of stamp characters is completed, the plate-making sheet B on which a stamp character label is provided is set by inserting the same into the inserting slot 9*a*.

Then, a predetermined button 22*a* of the push button group 22 is operated to cause the apparatus to execute the plate-making operation, i.e. printing of the stamp characters. The printing is effected simultaneously on the ink ribbon C and the plate-making sheet B. When the printing is completed, the ink ribbon (printed portion thereof) C is fed or advanced to set the same for exposure to ultraviolet rays, and at the same time plate-making sheet B is discharged from the take-out slot 9*b*. When it is confirmed by the plate-making sheet B discharged that there is no error in the printed stamp characters, the function switch 8 is rotated to the "EXPOSURE" position to switch the function of the apparatus to exposure, thereby causing an exposure block 65, later described, to expose the stamp body to ultraviolet rays.

When the exposure to ultraviolet rays is completed, the function switch 8 is rotated to the "OPEN" position to open the lid 7, and then the stamp body A is removed from the pocket 6 to wash the same. The washing completes the stamp. Before or after completion of the stamp, the stamp character label is peeled off the plate-making sheet B and attached on the back of the stamp.

Next, out of the components and elements of the stamp-making apparatus 1, those associated with the control block 300, described in detail hereinafter, will be described with reference to FIGS. 2 to 11, one by one.

The ribbon cartridge 11 is constructed such that it is removable from the mechanical block body 5, and the entire ribbon cartridge 11 may be replaced when the ink ribbon C is used up. As illustrated in FIG. 2, the ribbon cartridge 11 has a take-up reel 13 arranged at one end thereof and a supply reel 14 arranged at the other end thereof. The ink ribbon C is unrolled from the supply reel 14, fed along a feed path in the form of a rotation of an inverted-L shape as viewed in FIG. 2, and taken up by the take-up reel 13. The feed path in the form of a rotation of an inverted-L shape has a shorter side portion which a printing block 64, later described, faces and a longer side portion which the exposure block 65, later described, faces. The printing block 64 faces the ink ribbon C and the plate-making sheet B simultaneously, and the exposure block 65 faces the ink ribbon C printed with the image of the stamp characters.

The ink ribbon C is comprised of a transparent ribbon tape and ink coated thereon. In the present embodiment, it has a thickness of 6 μm. When the printing block 64 of the apparatus carries out printing on the ink ribbon C, a portion of ink coated on the ink ribbon, which defines a character, is transferred to the plate-making sheet B, whereby the ribbon tape of the ink ribbon C is formed with a negative image by a transparent portion from which the portion of ink defining the character has been transferred, while the plate-making sheet B is formed with a positive image by the transferred portion of ink defining the character. The ink ribbon C is sent forward to the exposure block 65 to use the resulting negative image-formed portion thereof as a mask in carrying out the exposure, while the plate-making sheet B is delivered from the apparatus for confirmation of the stamp characters and affixing the same to the stamp thus made.

Figure 4:
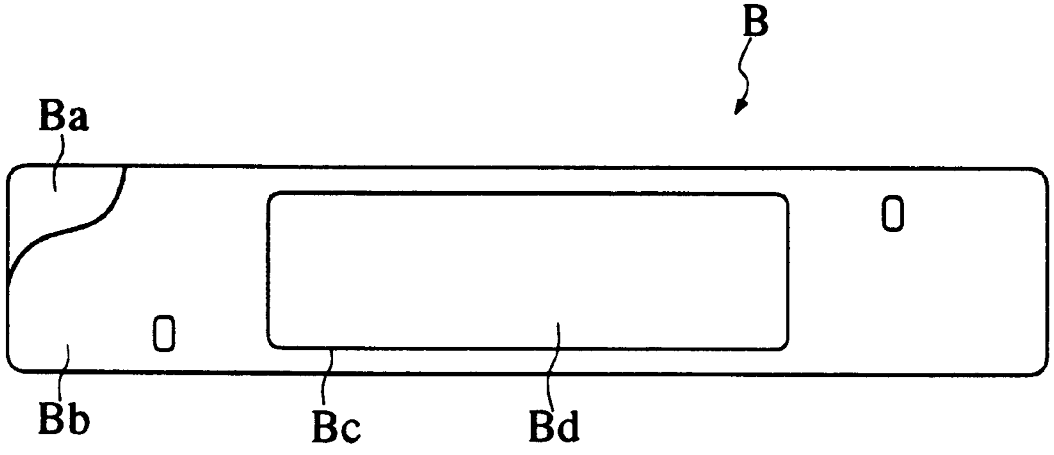
FIG. 4 is a view illustrating the structure of a plate-making sheet.

As illustrated in FIG. 4, the plate-making sheet B is a laminate of a base sheet Ba and an adhesive sheet Bb, generally in the form of a strip. The adhesive sheet Bb is formed with cutting lines Bc defining a rectangular area. The rectangular area of the adhesive sheet Bb is peeled off the base sheet Ba along the cutting lines BC to form the stamp character label Bd to be affixed to the back of the stamp. There are provided several types of the stamp body A which are different in shape from each other according to the use of stamps, and there are also provided respective corresponding types of the plate-making sheet which are different in the shape of an area of the stamp character label Bd (shape and size of an area defined by cutting lines).

Figure 3:
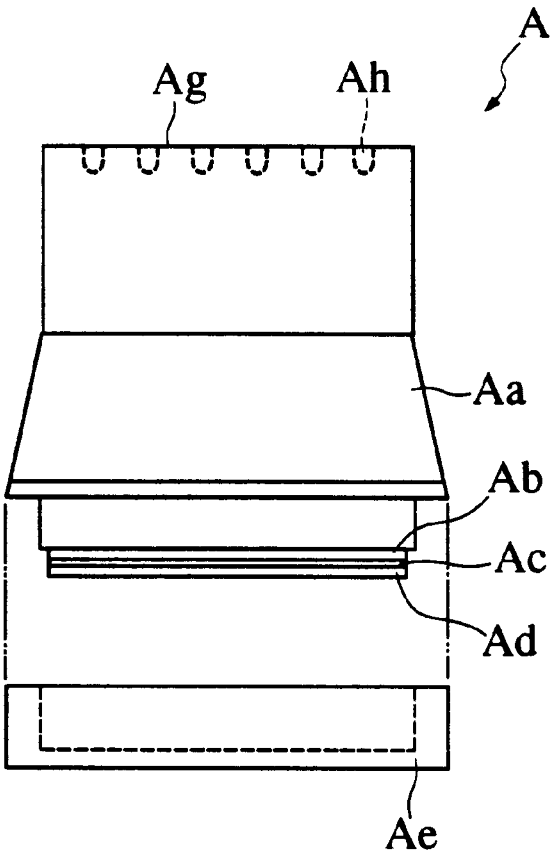
FIG. 3 is a view illustrating the structure of a stamp body.

On the other hand, as illustrated in FIG. 3, the stamp body A is comprised of a stock Aa (formed of a resin in the present embodiment), a thin sponge Ab (foamed urethane) affixed to a front end of the stock Aa, an ultraviolet-insensitive resin base Ac affixed to the sponge Ab, and an ultraviolet-curing resin affixed to the resin base Ac to form a stamp surface Ad. The ultraviolet-curing resin portion (stamp surface Ad) of the stamp body A is exposed to ultraviolet rays with the ink ribbon C as a mask, whereby portions of the stamp surface Ad corresponding to the stamp characters are cured. In this state, the stamp body A is taken out of the pocket 6, and washed with water to remove uncured portions of the stamp surface, which are soluble in water, from the stamp surface Ad. Thus the stamp is completed. Symbol Ae in the figure designates a cap made of resin.

Next, the printing block 64 will be described with reference to FIGS. 2 and 11. The printing block 64 includes a head-driving circuit 56*a* and a motor-driving circuit 57*a* both of which are connected to the output interface 305 of the control block 300, the print head (thermal head) 56 driven by the head-driving circuit 56*a* for printing stamp characters on the ink ribbon C, a platen roller 57 for feeding the ink ribbon C in a manner timed to printing operations of the print head 56, and a head temperature sensor 56*b* arranged on a head surface of the print head 56. Further, the casing 2 is formed with a feeding passage 181 through which the plate-making sheet B is fed to a contacting area between the print head 56 and the platen roller 57 and a delivery passage 182 through which the plate-making sheet B is delivered. The feeding passage 181 is formed with the inserting slot 9*a* which is open to the outside of the apparatus, at an upstream end thereof, and the delivery passage 182 is formed with the take-out slot 9*b* which is open to the outside of the apparatus, at a downstream end thereof.

The platen roller 57 is a drive roller as described hereinabove, and when the ink ribbon C is unrolled from the supply reel 14, it pulls in the plate-making sheet B between the print head 56 and itself to thereby bring a portion of the ink ribbon C and a portion of the plate-making sheet B, one upon the other, onto the print head 56. The print head 56 is a thermal head, and thermally transfers ink coated on the ribbon tape of the ink ribbon c to the plate-making sheet B. This transfer of the ink peels portions of ink corresponding to stamp characters off the ink ribbon C to reveal corresponding portions of the transparent base of the ribbon tape, while the peeled portions of the ink are attached to the plate-making sheet B as the stamp characters. The head surface temperature sensor 56*b* is formed by a temperature sensor, such as a thermistor, arranged on a surface of the print head 56 in an intimately contacting manner, and connected to the input interface 304 of the control block 300 for sending information on a temperature of the print head 56 detected thereby.

On the feeding passage 181 faces a sensor 183 which detects insertion of the plate-making sheet B and a feeding reference position of the same. The plate-making sheet B inserted into the feeding passage 181 is sent forward by the platen roller 57 depending on results of the detection of the sensor 183 whereby printing is started from one end of the stamp character label Bd. One of the walls defining the delivery passage 182, to the left of sheet B as viewed in FIG. 2 is formed with a separating nail 184 at an upstream end thereof, whereby the ink ribbon C and the plate-making sheet B being fed, one upon the other, are separated from each other. Thereafter, the ink ribbon C is sent forward to the exposure block, while the plate-making sheet B is delivered via the delivery passage 182 out of the apparatus.

Next, the exposure block 65 will be described with reference to FIGS. 2 and 11. The exposure block 65 includes a light source-driving circuit 191*a* connected to the output interface 305 of the control block 300, an ultraviolet ray source 191 arranged in a manner opposed to the stamp surface Ad of the stamp body A set in the pocket 6 and driven by the light source-driving circuit 191*a*, and a presser plate 58 arranged between the ultraviolet ray source 191 and the stamp surface Ad of the stamp body A. The ultraviolet ray source 191 is a self-heating hot-cathode tube called a semi-hot tube and supported on a fluorescent tube holder, not shown, provided on a base plate, not shown. The stamp surface Ad of the stamp body A, the presser plate 58, and the ultraviolet ray source 191 are arranged in parallel to each other with a gap between adjacent ones thereof. The ink ribbon C is fed between the stamp surface Ad and the presser plate 58.

The presser plate 58 is formed e.g. of a transparent resin, and moves forward (downward as viewed in FIG. 2) to urge the ink ribbon C against the stamp surface Ad of the stamp body A. More specifically, the exposure is carried out by causing the presser plate 58 to urge the ink ribbon C against the stamp surface Ad of the stamp body A, and lighting the ultraviolet ray source 191 to thereby irradiate the ink ribbon C with ultraviolet rays through the presser plate 58 (see FIG. 5). The exposure block 65 is provided with an ambient temperature sensor 67 which is connected to the input interface 304 of the control block 300, and sends information on a temperature of ambience of the exposure block 65 detected thereby to the input interface 304.

It should be noted that as the presser plate 58 is advanced, the first guide pin 53 and the second guide pin 54 are moved in the same direction. This movement decreases the tension of the ink ribbon C stretched between the first and second guide pins 53, 54, whereby the ink ribbon C is urged against the stamp surface Ad of the stamp body A with reduced tension, i.e. without forming any vertical wrinkles thereon.

Now, the above-mentioned state of the ink ribbon C is described in further detail with reference to FIGS. 2 and 5. Referring to FIG. 2, when the ink ribbon C is fed or advanced, the pulling force of the take-up reel 13 causes strong tension of the ink ribbon C, so that vertical wrinkles are formed on the ink ribbon C due to its very small thickness. Therefore, if the ink ribbon C is urged against the stamp surface Ad of the stamp body A as it is, there remain the wrinkles formed on the ink ribbon C urged against the stamp surface Ad, so that deformed images (negative) of the stamp characters on the ink ribbon C are used in carrying out the exposure of the stamp surface Ad to the ultraviolet rays. On the other hand, if the ink ribbon C is loosened, the exposure can be carried out with the images of the stamp characters being out of position. To eliminate these inconveniences, as illustrated in FIG. 5, the first guide pin 53 and the second guide pin 54 are moved forward in accordance with the forward movement of the presser plate 58, whereby the tension of the ink ribbon C is reduced, and at the same time, a slight stretching force is applied to the ink ribbon C by the tension pin 55, which is moderate enough not to produce any wrinkles on the ink ribbon C.

Figure 5:
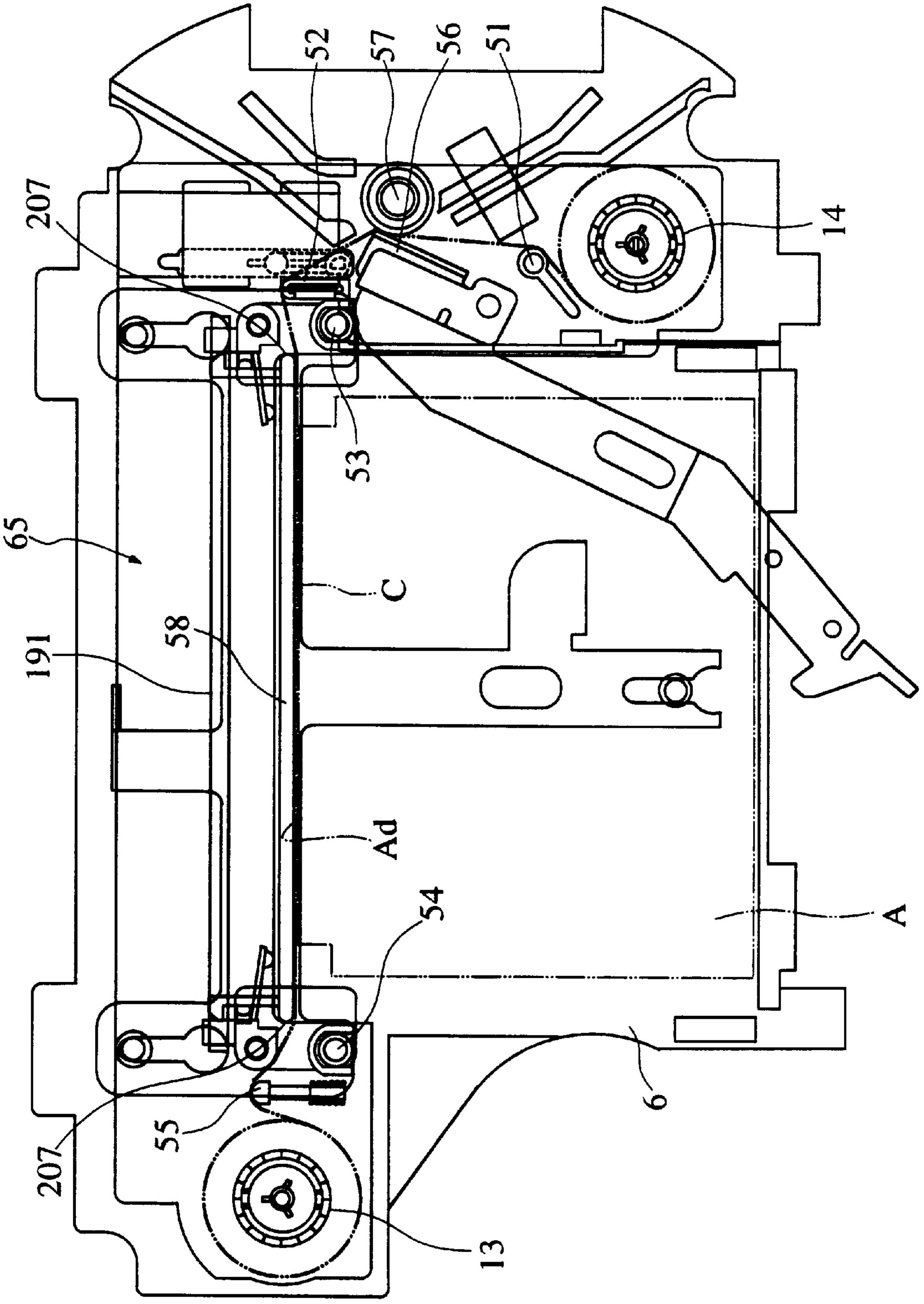
FIG. 5 is a plan view of an exposure system of the mechanical block and components associated therewith.
Figure 6:
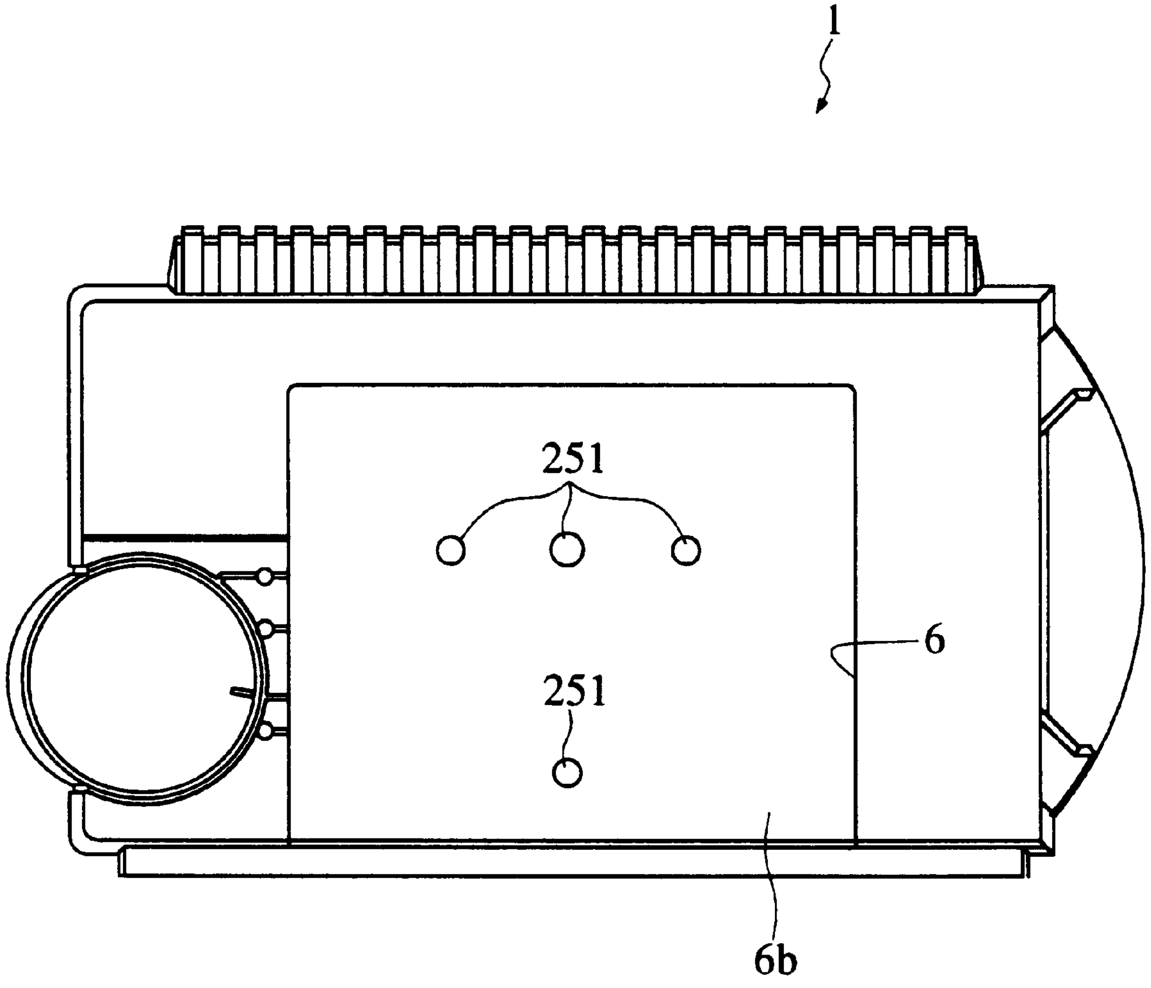
FIG. 6 is a plan view illustrating a pocket formed in the mechanical block with a lid removed therefrom.

Further, the ink ribbon C in the exposure position shown in FIG. 5 is bent backward at the longitudinal opposite ends of the presser plate 58 by the tension pin 55 and the second path-setting pin 52, and the chamfered portions 207 formed at the longitudinal opposite ends of the presser plate 58 operate to prevent undesired wrinkles from being produced on the ink ribbon C.

As described above, a positive image on the plate-making sheet B and a negative image on the ink ribbon C both formed by the printing are used as a stamp character label and an exposure mask, respectively. That is, the quality of these images directly reflects on the quality of a stamp as a final product. Especially, when the ink ribbon C, which is used as the exposure mask, is deformed, images of deformed characters are formed on the stamp body by the exposure. To eliminate this inconvenience, in addition to mechanical structural means for regulating the tension of the ink ribbon described above, electrical means of adjusting an amount of heat generated by the exposure process is provided to thereby prevent undesired wrinkles from being formed on the ink ribbon C.

Next, the stamp-detecting block 66, the operation of which is linked to the opening and closing of the lid 7, will be described. The stamp-detecting block 66 detects the mounting of the stamp body A in the pocket 6, and at the same time discriminates the type of the mounted stamp body A. The stamp body A includes various types having respective different shapes, e.g. ones for a square stamp, a personal name stamp, a business stamp, an address stamp, etc. The different types of stamp bodies A for respective types of stamps are identical in length, but different in width and thickness. It should be noted that the above "length" means a size of the stamp body A between the stamp surface Ad and a surface on an opposite side thereto (back surface Ag), the above "width" means a size of the stamp body A between surfaces of opposite lateral ends thereof in its position mounted in the pocket 6, and the above "thickness" means a size of the stamp body between an upper side surface and a lower side surface of the stamp body in its position mounted in the pocket 6. To set each of these various types of the stamp body A different in width and thickness to a fixed position with respect to the directions along the width and the thickness of the stamp body A; in the present embodiment, as illustrated in FIGS. 6 and 7A to 7D, four bosses, long and short, are provided on the bottom 6*b* of the pocket 6 such that they extend perpendicularly upward from the bottom, and the stamp body A is formed with fitting holes Af for fitting corresponding ones of the bosses therein, respectively, (see FIG. 7A to 7D).

Figure 7A:
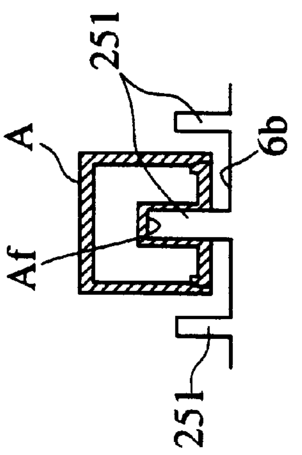
FIGS. 7A and 7B are explanatory diagrams for illustrating the construction of a stamp body of a square stamp when mounted in the pocket.
Figure 7B:
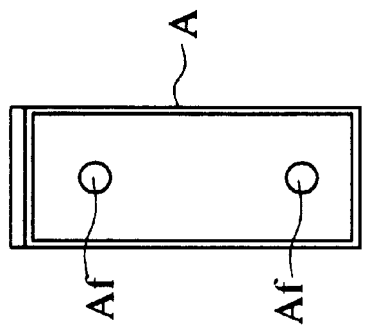
Figure 7C:
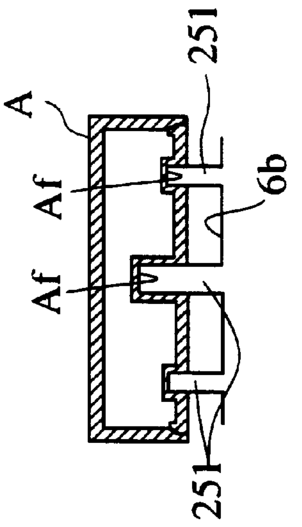
FIGS. 7C and 7D are explanatory diagrams for illustrating the construction of a stamp body of a business stamp when mounted in the pocket.
Figure 7D:
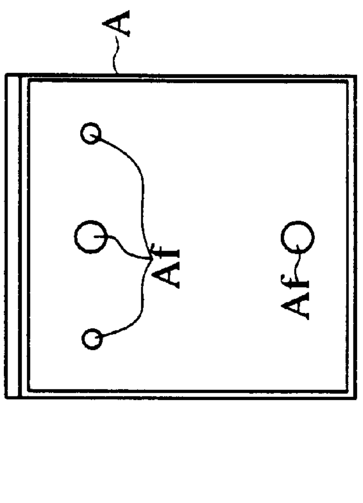
Figures 8A, 8B, 8C, 8D, 8E, 8F, 8G:
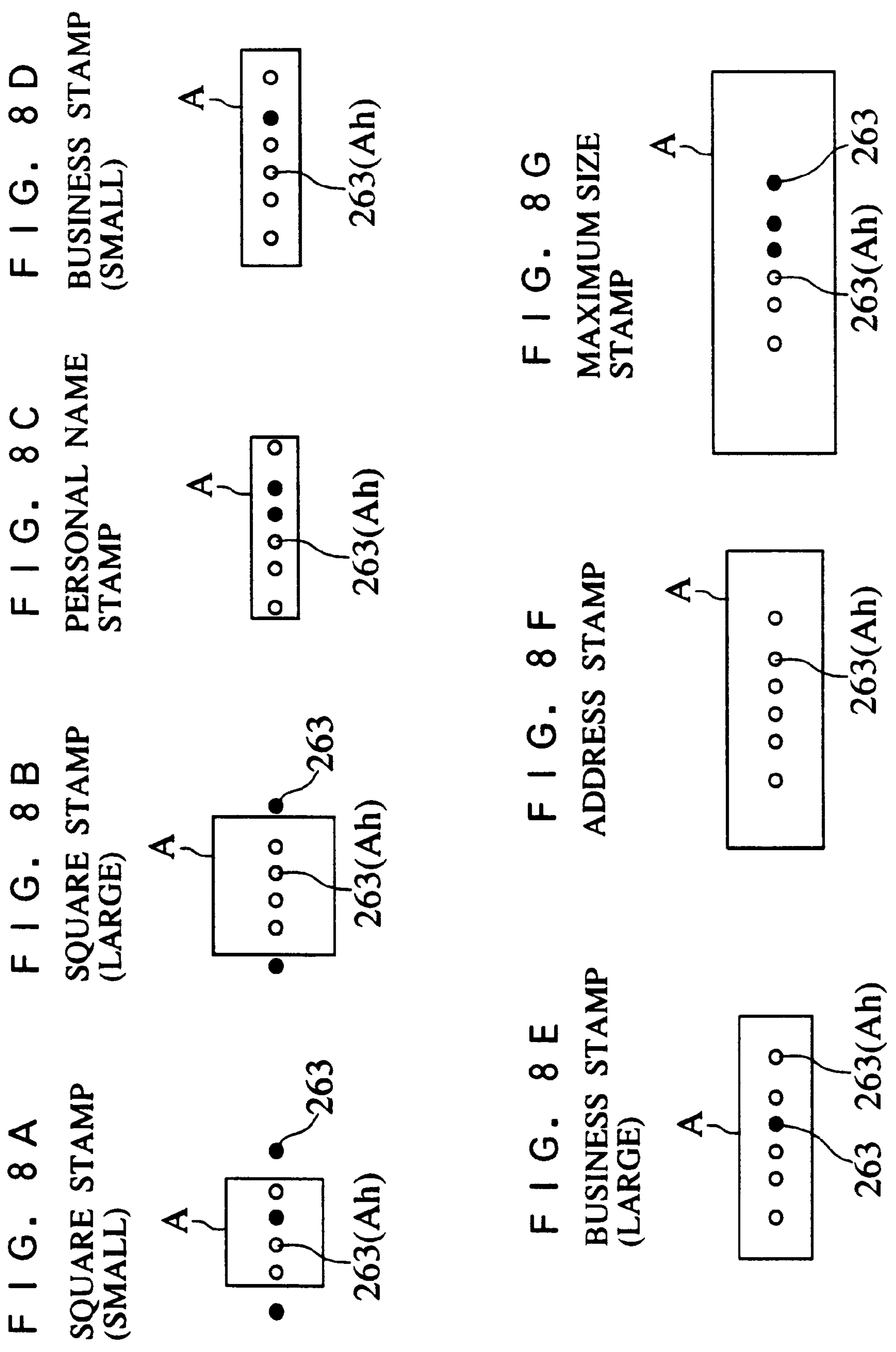
FIG. 8A is a diagram illustrating a pattern for discriminating a stamp body of a smaller square stamp.
FIG. 8B is a diagram illustrating a pattern for discriminating a stamp body of a larger square stamp.
FIG. 8C is a diagram illustrating a pattern for discriminating a stamp body of a personal name stamp.
FIG. 8D is a diagram illustrating a pattern for discriminating a stamp body of a smaller business stamp.
FIG. 8E is a diagram illustrating a pattern for discriminating a stamp body of a larger business stamp.
FIG. 8F is a diagram illustrating a pattern for discriminating a stamp body of an address stamp.
FIG. 8G is a diagram illustrating a pattern for discriminating a maximum size stamp body.

The four bosses are arranged to form a T shape, and in a manner corresponding thereto, a stamp body A for the square stamp, for example, is formed with two fitting holes Af (see FIGS. 7A and 7B), and a stamp body A for the business stamp, for example, is formed with four fitting holes (see FIGS. 7C and 7D). The number of the fitting holes Af and the depth of each of them depend on the type of the stamp body A, and this combination of the fitting holes Af and the bosses 251 enables each stamp body A to be mounted in the pocket 6 such that the center of the stamp surface Ad of the stamp body A mounted in the pocket 6 is positioned to a fixed location.

Further, the back surface Ag on the opposite side to the stamp surface Ad is formed with a plurality of small holes Ah (type-detecting holes) arranged side by side at respective central locations along the width of the stamp body A. The small holes Ah cooperate with a switch array 262 of the stamp-detecting block 66, later described, to detect the type of the stamp body A (see FIGS. 8A to 8G). The stamp character label Bd of the plate-making sheet B printed with stamp characters and delivered to the outside of the apparatus separately from the ink ribbon C is affixed to the back surface Ag of the stamp body A, whereby the small holes Ah are concealed.

Figure 9:
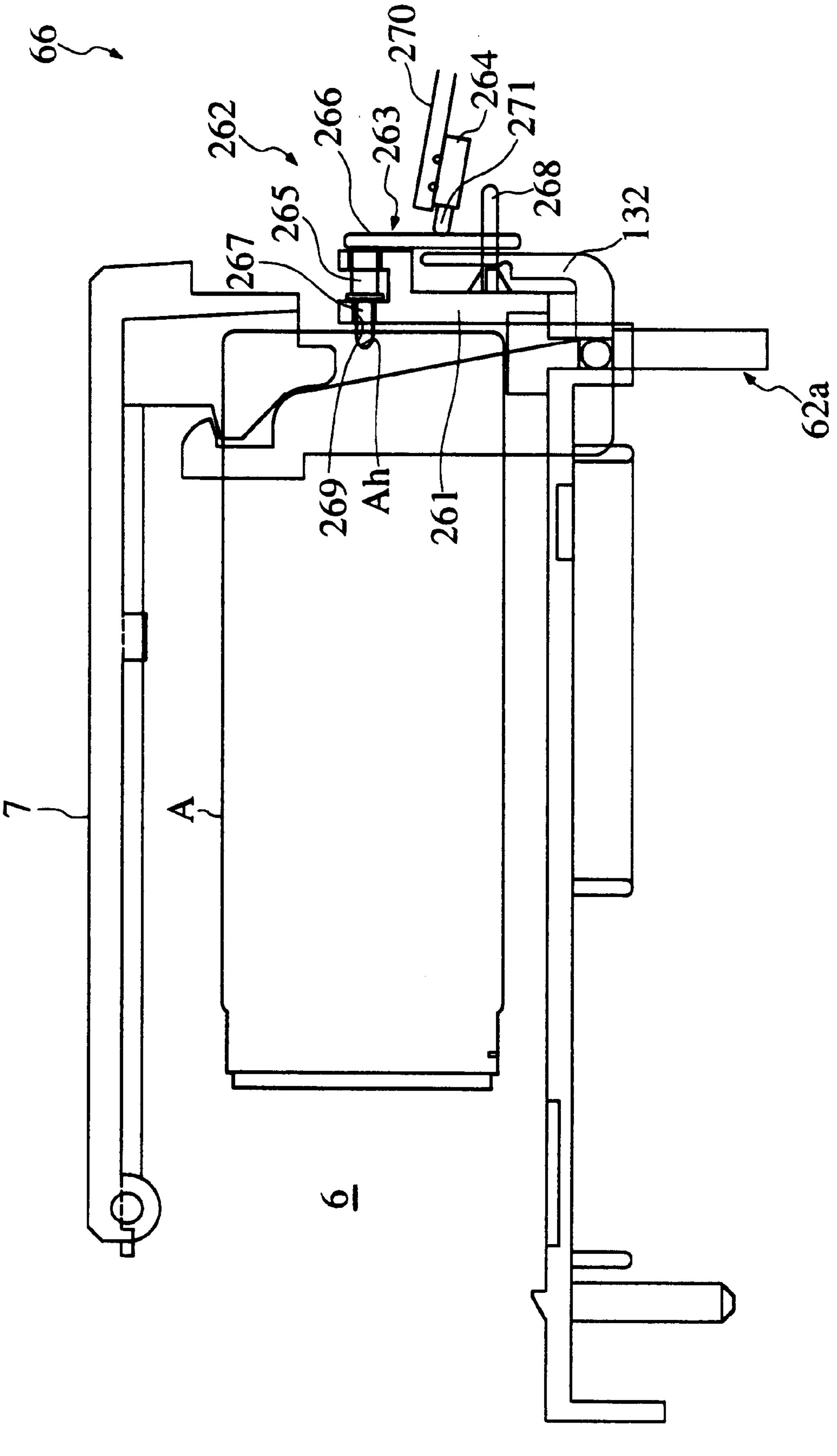
FIG. 9 is a cross-sectional view which is useful in explaining operations of a stamp-detecting block for detecting a stamp body.
Figure 10:
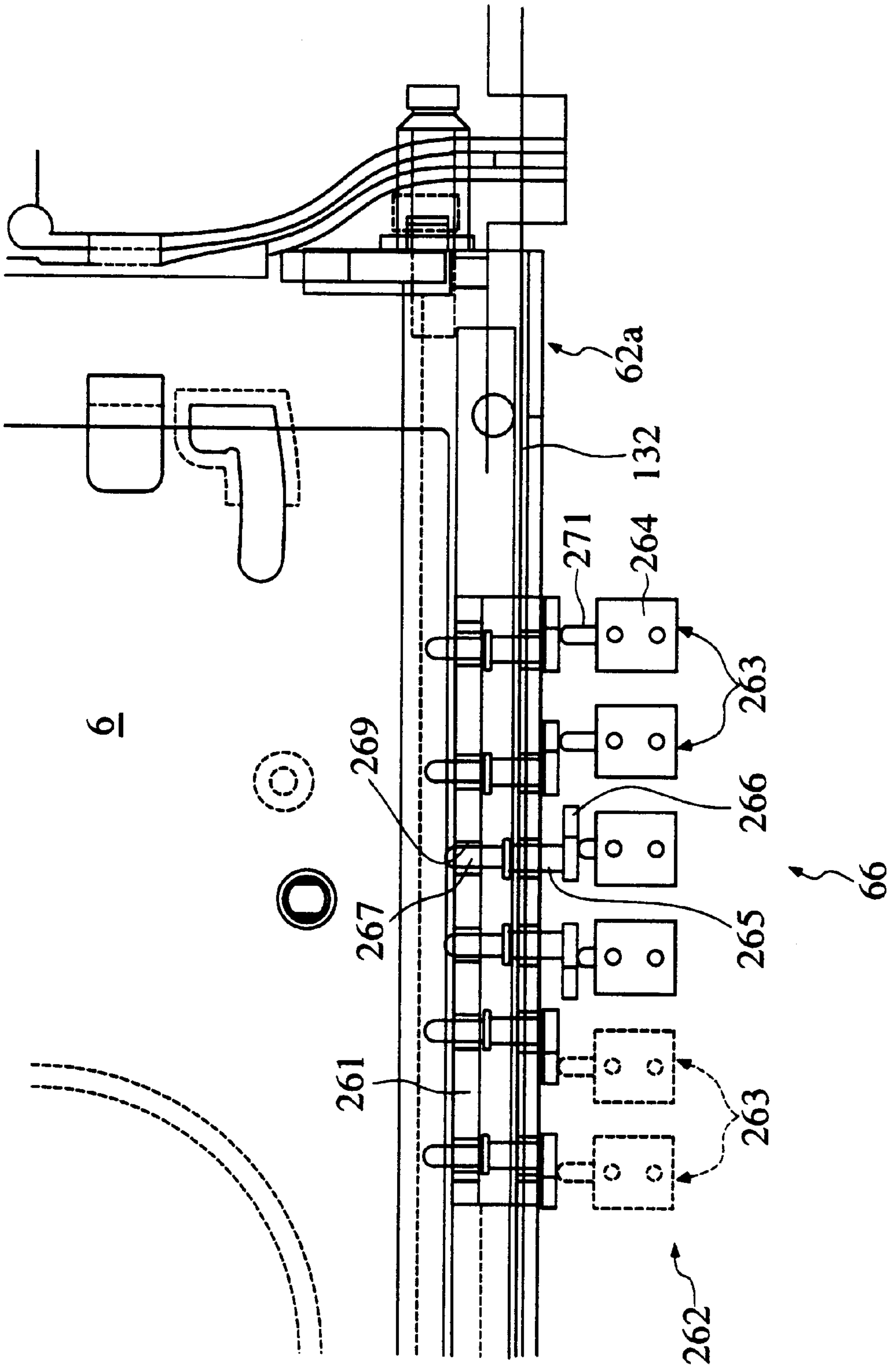
FIG. 10 is a partial plan view illustrating the pocket, the stamp-detecting block, and components associated therewith.

As illustrated in FIGS. 9 and 10, the stamp-detecting block 66 includes a switch holder 261 (also serving as a wall of the pocket 6) arranged such that it is opposed to the back surface Ag of the stamp body A when it is mounted in the pocket 6, and the switch array 262 formed of six detecting switches 263 supported on the switch holder 261. Each detecting switch 263 is comprised of a switch body 264 formed e.g. of a push switch, and a switch top 265 having one end for being projected into the pocket 6. The switch top 265 includes a plate portion 266 and a detecting projection 267 (including the one end) extending at a right angle to the plate portion 266, with a lower part of the plate portion 266 being guided by a guide projection 268 formed in the switch holder 261 and the detecting projection 267 being guided by a guide hole 269 formed through the switch holder 261 for forward and backward motions thereof.

The switch body 264 is fixed to the reverse side surface of a base plate 270 such that a plunger 271 of switch body 264 abuts the plate portion 266 of the switch top 265. The plunger 271 urges the switch top 265 toward the pocket 6 by the urging force generated by its spring, not shown. A state of the one end of the detecting projection 267 projected into the pocket 6 via the guide hole 269 through the switch holder 261, and a state of the same being retracted against the urging force of the plunger 271 correspond to ON-OFF states of the detecting switch 263, respectively. Actually, when any of the detecting switches 263 of the switch array 262 is turned on, mounting of the stamp body A is detected, whereas when all of the detecting switches 263 are turned off, removal of the stamp body A is detected. The detecting switches 263 of the switch array 262 are each in ON or OFF state depending on whether a corresponding small hole Ah exists in the stamp body A. Therefore, the type of the stamp body A can be determined from a pattern of ON/OFF states of the six detecting switches 263.

FIGS. 8A to 8G illustrate the relationship between small holes Ah in the stamp body A and the six detecting switches 263 (detecting projections 267). Provision of the six detecting switches 263 for detecting presence or absence of the small holes Ah makes it possible to detect 2n−1 (n=6), i.e. 63 types of patterns. A stamp body A for a square stamp or the like, which is small in width, has no small holes Ah corresponding to two outermost detecting switches 263, 263 on respective opposite sides, and the two detecting switches 263, 263 project into space at opposite locations outside the stamp body A. That is, a stamp body A having a small width, such as a stamp body A for a square stamp, is recognized by a pattern for a stamp body A having imaginary small holes Ah at outermost locations thereof.

Next, the control block 300 will be described with reference to FIG. 11. The control block 300 is based on, e.g. a microcomputer, and includes a CPU 301, a ROM 302, an input interface 304, an output interface 305, and a system bus 306 connecting all these devices to each other.

The ROM 302 stores various programs, dictionary data for kana-kanji character conversion, font data of characters, symbols, etc. and fixed data, such as data of a predetermined stamp frame. The RAM 303 is used as a working area, and also as means for storing fixed data input by a user. The data stored in the RAM 303 is backed up even when the power is turned off.

The input interface 304 interfaces to fetch signals from the function switch 8, the push button group 22 and the operating dial 23 of the operating block 21, the head surface temperature sensor 56*b* of the printing block 64, the ambient temperature sensor 67 of the exposure block 65, and the stamp-detecting block 66, via the system bus 306 into the CPU 301 or the RAM. The output interface 305 interfaces to deliver control signals and data used in control operations received via the system bus 306 from the CPU 301, the ROM 302, and the RAM 303 to the light-emitting elements 12, the display-driving circuit 24*a* of the operating block 21, the head-driving circuit 56*a* of the printing block 64, the motor-driving circuit 57*a*, the light source-driving circuit 191*a* of the exposure block 65, etc.

The CPU 301 carries out processing based on input signals from the input interface 304, and a processing program stored within the ROM 302 and selected according to the processing on each occasion, using the RAM 303 as the working area, and fixed data stored within the ROM 302 and the RAM 303, as needed.

Figure 12:
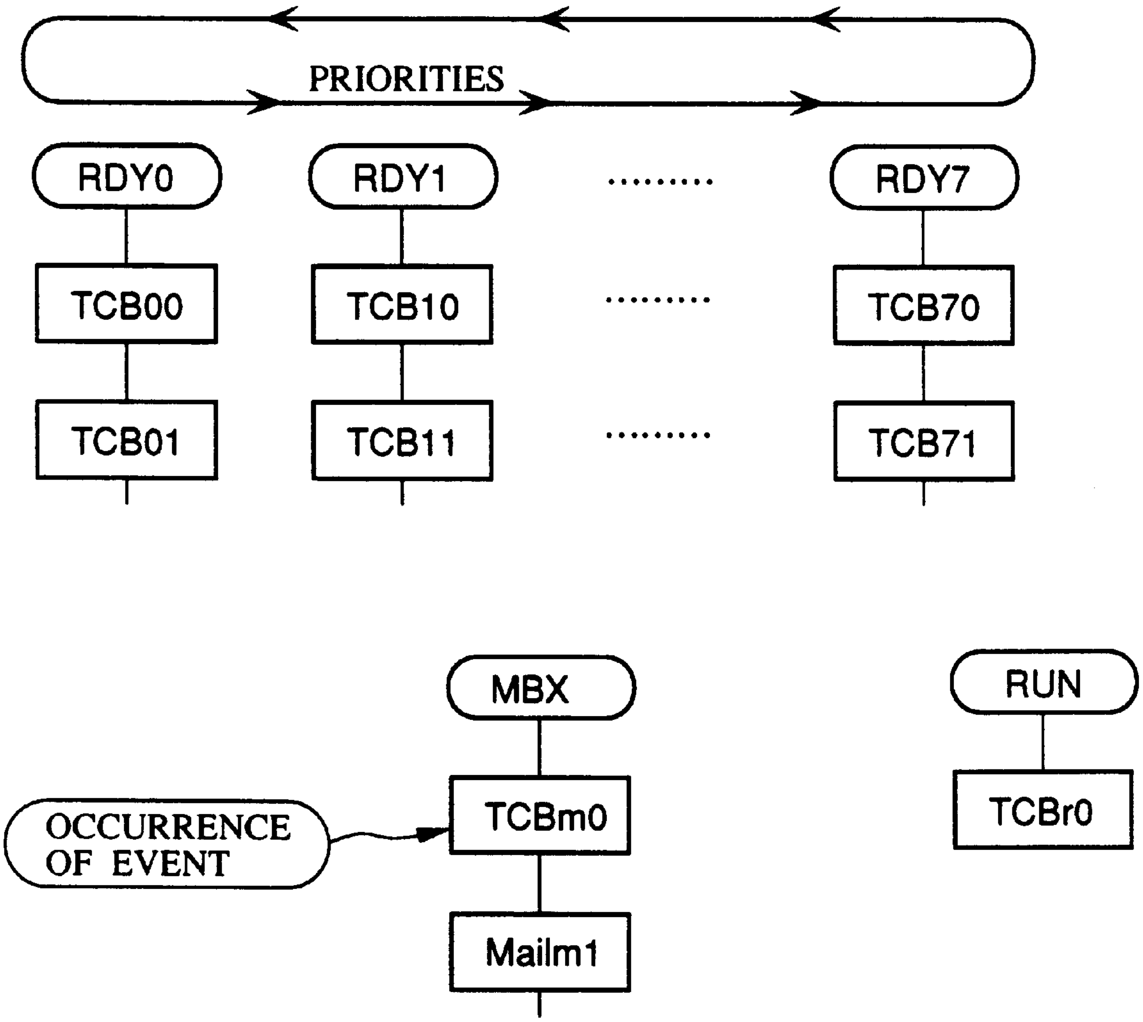
FIG. 12 is a conceptual representation of an outline of multitasking executed in the stamp-making apparatus.

The stamp-making apparatus 1 of the present embodiment carries out multitask processing in the following manner:

FIG. 12 illustrates a conceptual representation of the multitasking of the present embodiment. A plurality of tasks to be executed are classified into groups having respective priorities RDY0 to RDYn (in the case of the illustrated example, n=7), and the order of processing of tasks is determined based on the priorities to thereby activate each task. In the following description, tasks assigned the highest priority RDY0 are designated as TCB0i (i=0, 1, 2, . . . ), and tasks assigned the lowest priority are designated as TCB7i. In general, a task assigned the priority RDYj (j=0 to 7) is designated as TCBji. Further, when a task is classified into a group having the priority RDYj, and placed in a wait state in this group, i.e. in the priority, this state will be described e.g. as "a task TCBm0 is registered as TCBj0". When one or more tasks assigned the priority RDYj are registered, it will be expressed as "task existing in RDYj".

Further, as illustrated in FIG. 12, in the multitasking, an area is set aside for registering a name of each task (e.g. TCBm0 shown in the figure) created for execution in response to an event, such as an interrupt, generated e.g. by depression of any of the push buttons of the push button group 22 or operation of the operating dial 23, and for registering a communication task between tasks (e.g. Mailm1 illustrated in the figure; hereinafter simply referred to as a "mail"). This area will be referred to as "mail box MBX" in the following description. Further, the name of a task representative of the contents of current or actual processing is expressed as TCBr0, and execution of this task for processing is expressed as "the active task run processing", or "the RUN processing" in an abbreviated form. For example, when a task TCB00 is selected and activated, it will be expressed as "the task TCB00 is registered as TCBr0 and activated". This registration is shown as "TCBr0←TCB00" in hierarchical operation diagrams, later described, and flow charts. The task TCBm0 in the mailbox MBX contains information concerning whether the task TCBr0 currently being executed should be forcedly interrupted or not, and which priority RDYi it should be registered in, and in MBX processing, later described, the task TCBm0 is executed according to these pieces of information.

Figure 13:
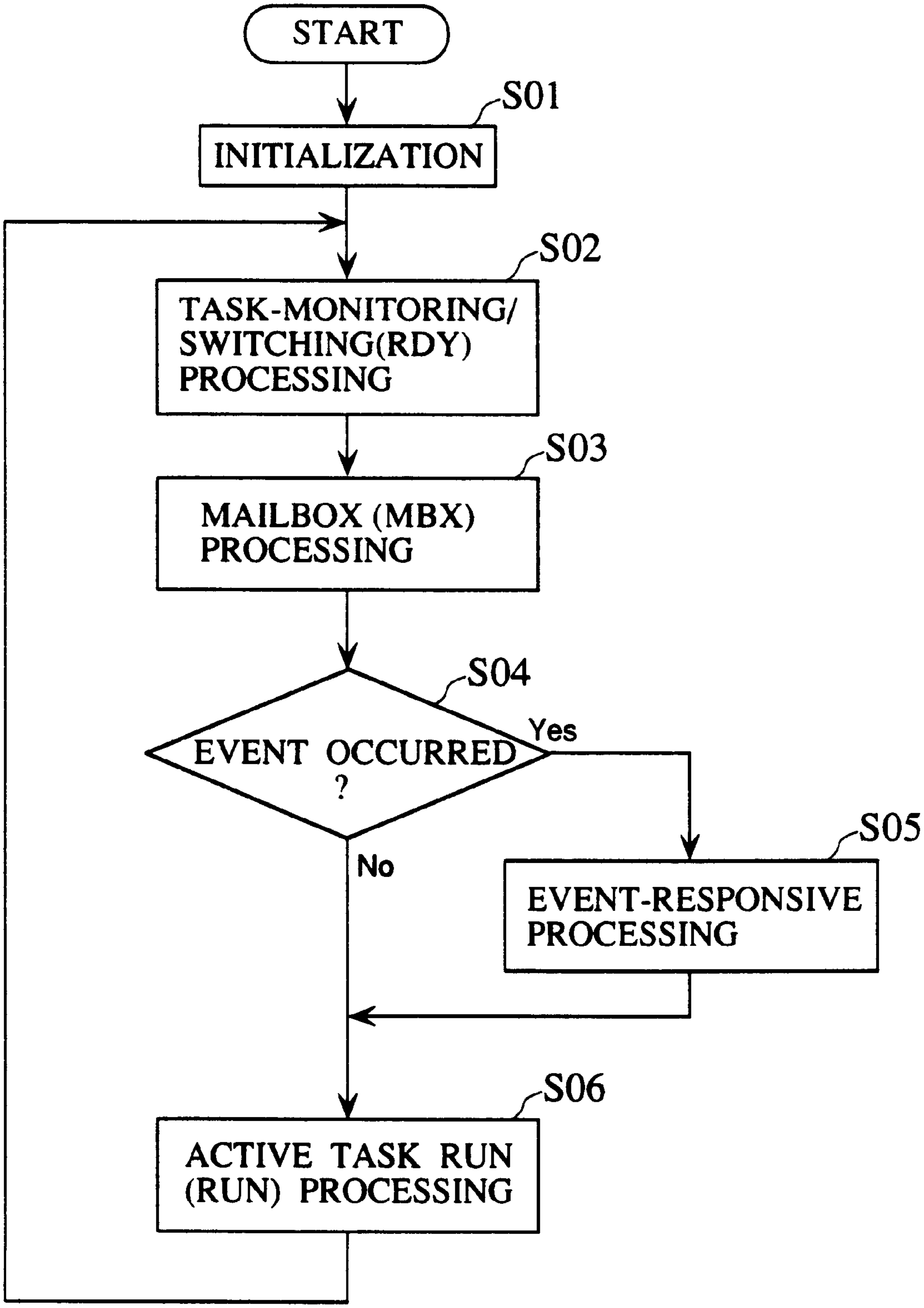
FIG. 13 is a flow chart illustrating an outline of the overall processing of the stamp-making apparatus.

FIG. 13 illustrates a procedure of processing executed according to an embodiment of the present invention, expressed in the form of an ordinary flow chart. As illustrated in the figure, when the stamp-making apparatus 1 is powered on to start the processing, an initialization of each device of the stamp-making apparatus is first executed at step S01, task-monitoring/switching (RDY) processing at step S02, and mailbox (MBX) processing at step S03. Then, it is determined at step S04 whether or not any event has occurred. If an event has occurred, event-responsive processing is executed at step S05, and thereafter, the active task run (RUN) processing is executed at step S06. Then, the RDY processing (step S02) to the RUN processing (step S06) are repeatedly executed.

However, in the actual processing, the RDY processing and the MBX processing are executed only at predetermined regular timing, but event-responsive processing is started upon occurrence of the event, while the RUN processing is executed during execution of the other processing. Therefore, the present multitasking cannot be expressed accurately enough by the above flow chart, and the hierarchical structure of the program is difficult to understand therefrom. Therefore, in the following description, when a sequence of steps of a task is described, a flow chart is employed which illustrates a task actually executed by activating another task for the multitasking as a subroutine. Event-driven type tasks, i.e. tasks which are initiated or activated in response to respective events, are described by a description method used in a diagram of FIG. 14 (hereinafter referred to as "the hierarchical operation diagram").

Figure 14:
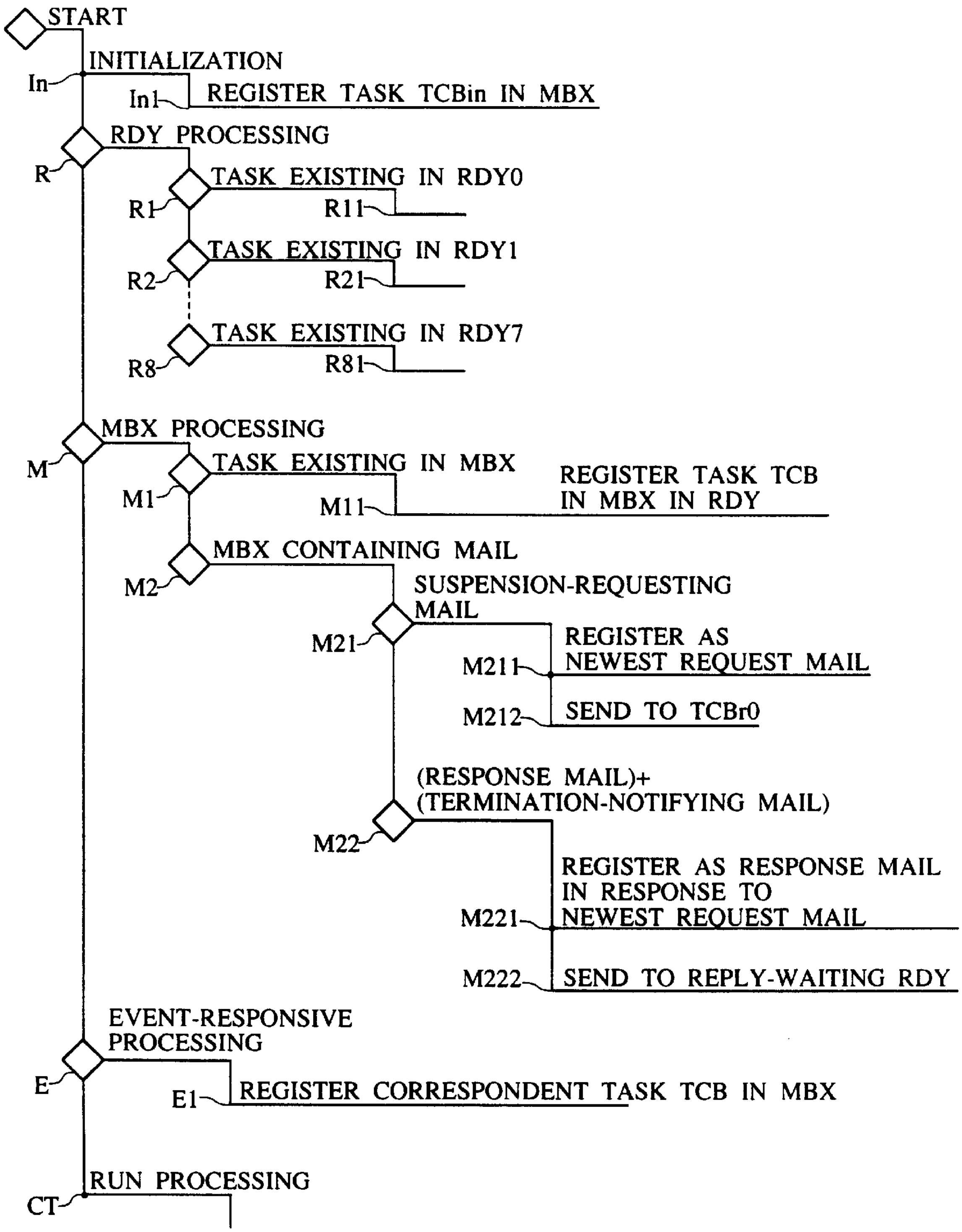
FIG. 14 is a hierarchical operation diagram illustrating main tasks executed in the stamp-making apparatus.

In the hierarchical operation diagram, each processing branch point designated by symbol ◇ represents a task, a program, or a subroutine, which is of an event-driven type i.e. executed when an event, such as an interrupt or activation of a task initiated by another task, has occurred. The task-monitoring/switching (RDY) processing illustrated in FIG. 14 is started only when an interrupt is generated at regular time intervals e.g. through a real time monitoring. Further, the mailbox (MBX) processing is also started by an interrupt generated at regular time intervals other than the regular time intervals of the PDY processing. The event-responsive processing registers various events, such as tasks initiated by operations of the operating dial 23, in the mailbox MBX. Although only one routine is illustrated in FIG. 14 as a representative, actually, the mailbox MBX is accessed for registration of the name of a task to be executed in response to each event independently whenever the event occurs.

As illustrated in FIG. 14, when the program is started by turning on the power, first, the initialization at a processing branch point In (hereinafter referred to as "the initialization (In)") is executed. The initialization (In) registers a task TCBin of main tasks-starting processing in the mailbox MBX (In1). When the initialization (In) is terminated, if it is neither time for the RDY processing nor time for the MBX processing, or any other event has not occurred, then the program proceeds to the RUN processing (CT). However, at this time point of the present case, there is no task registered, so that time for starting the RDY processing or the MBX processing is awaited.

In this state, when it becomes time for the RDY processing, the RDY processing (R) is executed, but there are no tasks registered in the priorities RDY0 to RDY7, i.e. no tasks exist in the priorities RDY0 to RDY7 (R1 to R8), so that the RDY processing is terminated without executing any specific processing. On the other hand, when it is time for the MBX processing, the MBX processing (M) is executed, and according to the task TCBin for starting main tasks, which has been registered as TCBm0 in the mailbox MBX, the processing of "task existing in MBX (M1)" is executed to register the task TCB of the mailbox MBX in the priority RDY (M11). Specifically, if the priority specified for the task TCBin corresponds to the priority RDY4, the task TCBin is registered as TCB40 in the priority RDY4.

Figure 15:
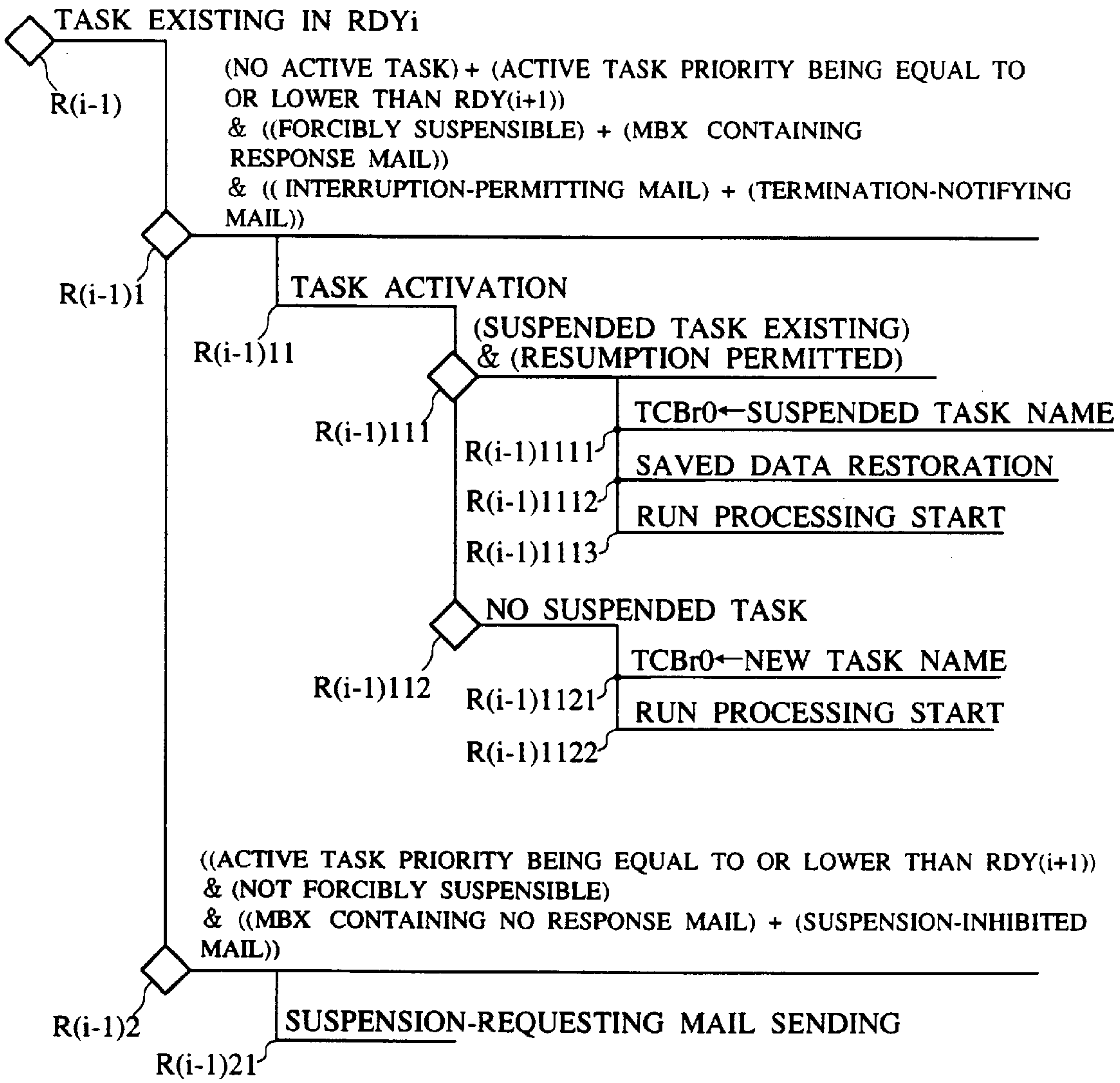
FIG. 15 is a hierarchical operation diagram of task-monitoring/switching processing executed in the stamp-making apparatus.

In this state, when it is time for the RDY processing, the RDY processing (R), e.g. the processing of "task existing in RDY4 (R3)" is executed. Now, the processing of "task existing in RDYi (R(i−1))" will be described with reference to FIG. 15. This processing generally branches into a case of activating a new task, a case of sending a suspension-requesting mail to the active task without starting a task, and a case of executing no processing.

First, if there is no active task, i.e. if there is no task registered as TCBr0, and hence the RUN processing is not being executed, or if the active task TCBr0 has a priority equal to or lower than the priority RDY(i+1), and at the same time, the active task is suspensible, another task is started. The term "suspensible" means that the task to be activated can forcibly interrupt execution of the active task, or that a response mail in response to the suspension-requesting mail is an interruption-permitting mail or a termination-notifying mail indicative of termination of the active task. Under the above-mentioned condition, i.e. when the conditions expressed by (no active task)+(active task priority being equal to or lower than RDY(i+1)) & ((forcibly suspensible)+(MBX containing response mail) & ((interruption-permitting mail)+(termination-notifying mail)) are fulfilled at R(i−1)1, the new task is activated at R(i−1)11. Here, "+" represents a logical sum (OR), while "&" a logical product (AND).

On the other hand, a suspension-requesting mail is sent to the mailbox MBX, if the priority of the active task is equal to or lower than RDY(i+1), and at the same time there is no response mail from the active task so that it is not known whether the active task is suspensible or not, or the situation requires to again send the suspension-requesting mail after a response mail saying that the active task is not suspensible was received in response to the preceding suspension-requesting mail. That is, if the conditions expressed by (active task priority being equal to or lower than RDY(i+1) & (not forcibly suspensible) & ((MBX containing no response mail)+(suspension-inhibited mail)) are fulfilled at R(i−1)2, a suspension-requesting mail is sent at R(i−1)21. If neither of the above two sets of conditions are fulfilled, i.e. if the active task priority is equal to or higher than RDYi, no particular processing is executed, but the processing of "task existing in RDYi (R(i−1))" is terminated.

In the new task activation (R(i−1)11), if there exists any other task which has been suspended to activate a task higher in priority, or to start a subtask and wait for results of processing by the subtask, it is determined e.g. from resumption information, later described, whether the suspended task can be resumed or not. If the suspended task can be resumed, the processing of (suspended task existing) & (resumption permitted) (R(i−1)111) is executed. In this processing, the suspended task is registered as the active task TCBr0 at R(i−1)111, and if there are any saved data or the like, these data are restored or returned at R(i−1)1112, followed by newly starting the RUN processing at R(i−1)1113. The generation of this event causes the new task activation (CT1) to be activated in the RUN processing (CT), later described.

When there is no suspended task, the processing of "no suspended task" is executed at R(i−1)112, and after the processing of "TCBr0←new task name" is executed at R(i−1)1112, the RUN processing is started again at R(i−1) 1122. For example, when the task TCBin for activating the main tasks is to be executed, in the processing of new task activation (R311), the processing of "TCBr0←TCBin (R31121)" is executed in "no suspended task (R3112)", and then the RUN processing is started at R31122.

On the other hand, if there is a suspended task but the resumption of the suspended task is inhibited, the permission of resuming the suspended work has to be awaited, so that the new task activation (R(i−1)11) is terminated without executing any processing. It should be noted that since the above-mentioned subtask is normally set to a higher priority than the originating task, it is a general tendency that the subtask has already been terminated when the task initiation (R(i−1)11) is processed, thus permitting the originating task to be resumed.

Next, the mailbox (MBX) processing will be described with reference to FIG. 14. In this processing, in the case of "task existing in MBX (M1)", the task TCBm0 in the mailbox MBX is registered at M11 in a priority RDYj according to a priority specified for the task. In the case of "MBX containing mail (M2)", if the mail is a suspension-requesting mail (M21), it is registered as the latest request mail at M211, and sent to the active task TCBr0 at M212, whereas if the mail fulfills the conditions expressed by "(response mail)+(termination-notifying mail)" at M22, it is registered as a response mail in response to the latest request mail (at M221) and sent to a reply-waiting RDY (at M222).

Next, the event-responsive processing (E) will be described. Although the initialization (In) is described as a different kind of processing from this processing for the convenience of explanation, it is actually a kind of event-responsive processing (E). That is, the event-responsive processing (E) registers a task created by an event from the outside of the CPU, such as a manipulation of the operating dial 23, or a task created for execution of a program for internal processing, in the mailbox MBX at E1. For example, after registration in the mailbox MBX, the task TCBin for starting the main tasks is registered in the priority RDY, and then executed as a new task by the (RUN) processing described below.

Figure 16:
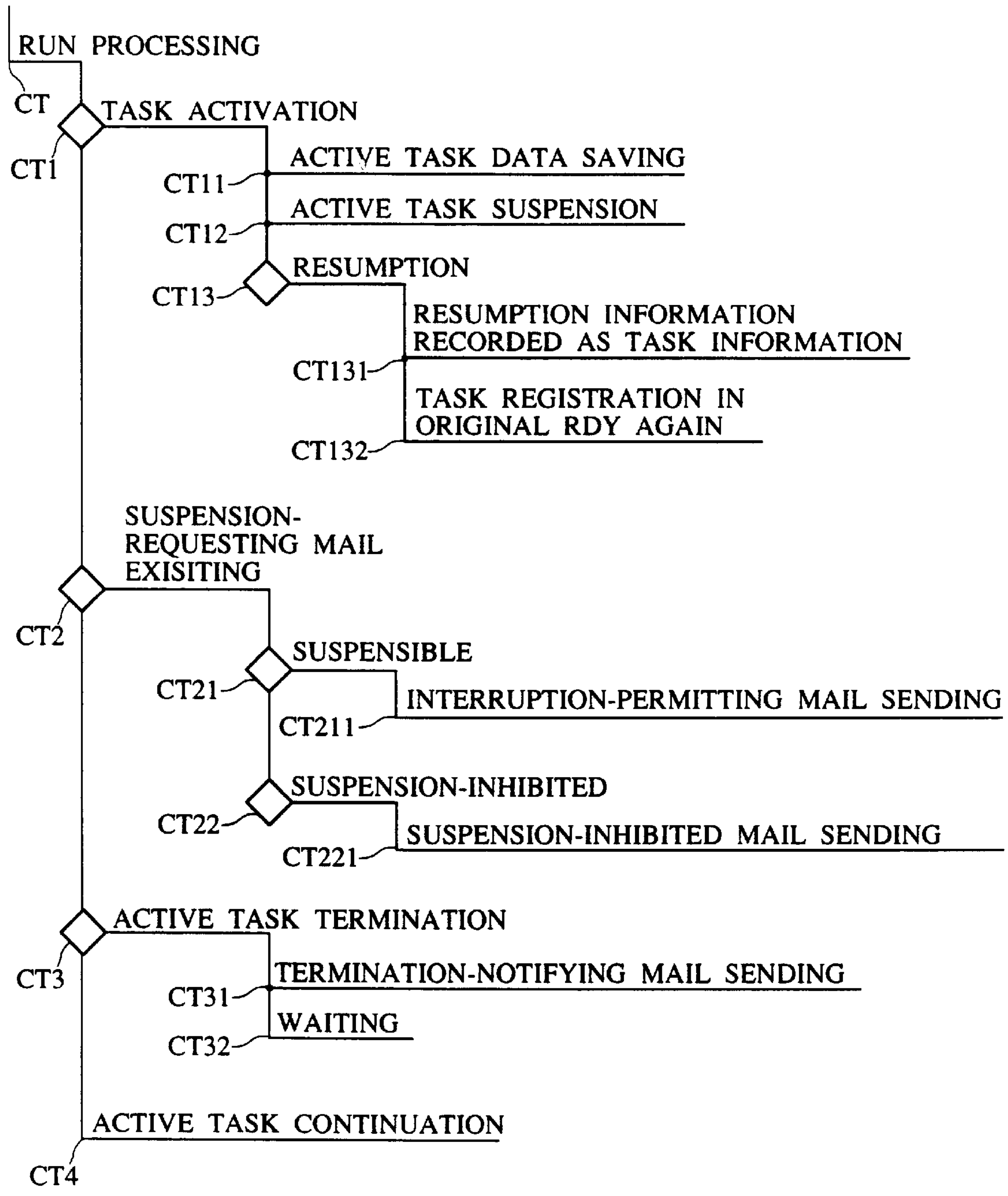
FIG. 16 is a hierarchical operation diagram of active task-executing processing executed in the stamp-making apparatus.

Now, the active task run (RUN) processing (CT) will be described with reference to FIG. 16. This processing continues the active task TCBr0 when there is no other event generated as described above. During this processing, there occur events of "task activation (CT1)", "suspension-requesting mail existing (CT2)" and "active task termination (CT3)". If these events do not occur, the processing of the active task is continued at CT4. If another task is to be activated at CT1, data of the active task being executed is saved at CT11, and then the active task is suspended at CT12. If resumption of the task is expected at CT13, resumption information is recorded as task information at CT131, based on which the task is registered again in the original priority RDY at CT132.

When the suspension-requesting mail existing at CT2, it is determined whether or not the active task is in a suspensible state. If the active task is suspensible at CT21, an interruption-permitting mail is sent to the mailbox MBX at CT211, while if it is not suspensible at CT22, a suspension-inhibited mail is sent at CT221. It should be noted that although similar processing is executed to temporarily suspend the RUN processing, when the RUN processing (CT) being executed is switched to the RDY processing (R), the MBX processing (M) or the event-responsive processing (E), this processing is a basic routine for real-time monitoring which is different from the processing of switching to the other tasks, and hence description thereof is omitted. When the active task TCBr is terminated at CT3, the termination-notifying mail is transmitted to the mailbox at MBX CT31, and the following task activation is awaited at CT32.

Figure 17:
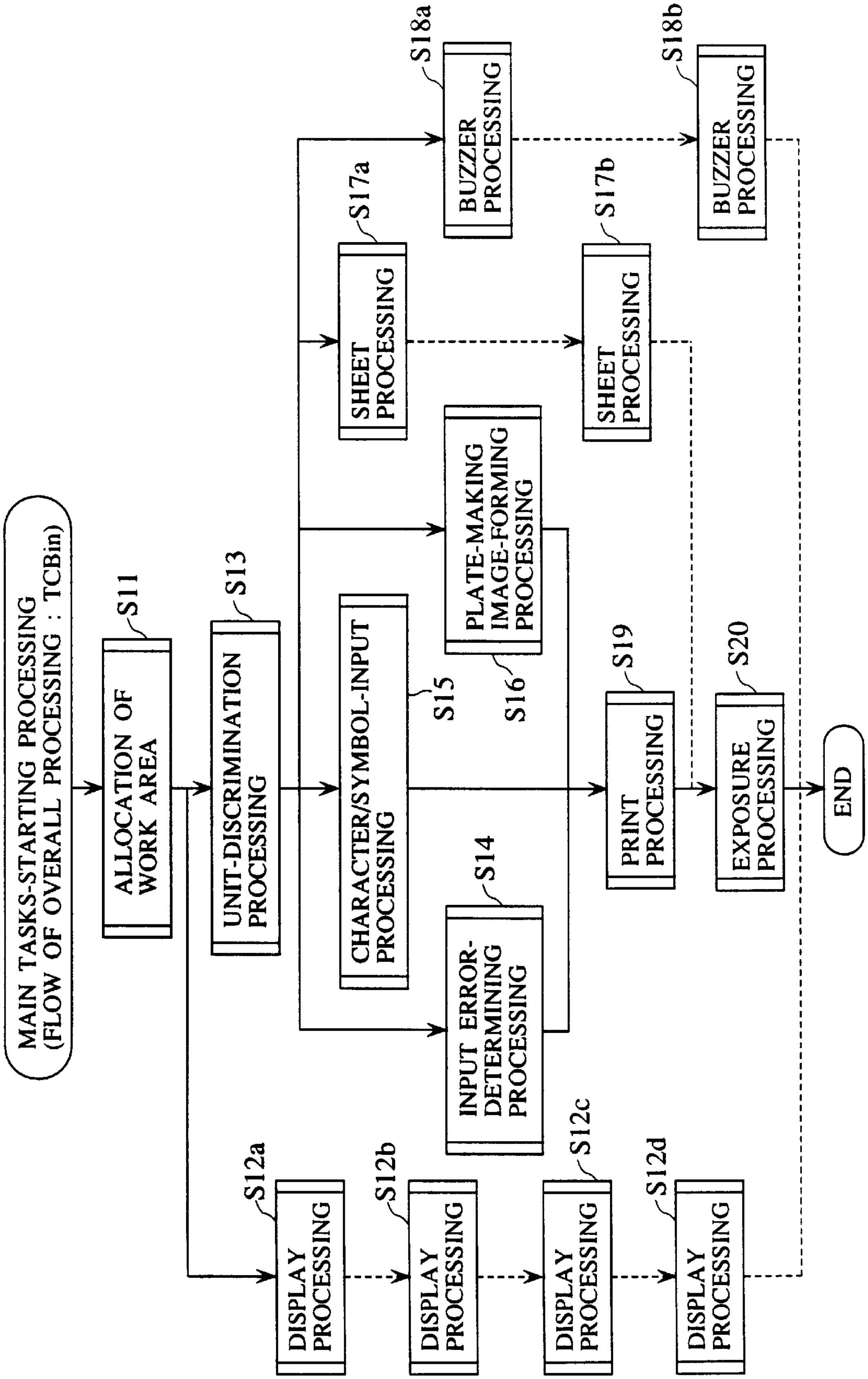
FIG. 17 is a flow chart of an example of main tasks-starting processing executed in the stamp-making apparatus.

FIG. 17 illustrates an example of the main tasks-starting processing. As illustrated in the figure, when the main tasks-starting processing task TCBin is activated, a task of allocating work area is first registered in the mailbox MBX at step S11, and then a task of display processing and a task of unit (stamp body)-discriminating processing are registered in the mailbox MBX at respective steps S12 and S13. Then, a task of input error-determining processing is registered at step S14, a task of character/symbol-input processing at step S15, a task of plate-making image (stamp image)-forming processing at step S16, a task of sheet processing at step S17, and a task of buzzer processing at step S18. Then, after a task of print processing is registered at step S19, a task of exposure processing is registered at step S20. The MBX processing classifies these subtasks according to the order of priority and registers each of them in a proper priority RDYj, and then the RDY processing causes them to be activated one after another. Further, after these subtasks are started, subtasks of the subtasks are registered in the mailbox MBX as required and each of them is activated by the RDY processing.

Stated another way, a plurality of tasks including the task TCBin of the initialization continue to be executed until they are each eventually placed in a wait state by any reasons. The internal processing of the stamp-making apparatus 1 proceeds to a next step by the multitasking described above when another task as a cause of the wait state of a task has progressed to be deactivated, so that eventually, the internal processing of the multitasking enters a state in which an entry or other manipulation by the user is awaited. Conversely, once the user manipulates the stamp-making apparatus 1, the tasks therefor including error handling tasks are sequentially carried out, and eventually the program enters a state in which another manipulation by the user is awaited.

Therefore, the user actually feels that various processing operations or tasks are executed in parallel and simultaneously. More specifically, according to the processing of the present stamp-making apparatus 1, compared with a manner of processing in which the processing proceeds to a next step each time only in response to a manipulation by the user, various kinds of processing operations which will be required to be executed later can be executed in advance, whereby a time period during which the man or user has to wait can be minimized, enabling high-speed processing to be attained. It should be noted that parallel processing, such as the multitasking processing described above, can be realized by forming the program or all the tasks described above by interrupt handlers and employing an interrupt control circuit which controls the order of priority of interrupts generated.

The dotted lines in FIG. 17 show that tasks appear to be simultaneously executed in parallel with each other. Further, the task of character/symbol-input processing (step S15), the task of input error-determining processing (step S14), and the task of plate-making image-forming processing (step S16) are simultaneously executed. More specifically, after a first entry of characters or the like (letters, symbols, figures, or the like) is effected, and before the following entry of characters or the like is effected (step S15), it is determined at step S14 whether or not there is an inconvenience in the number of characters entered in a text, and an image for use in the plate-making is formed at step S16. In the course of executing these steps, if a character entry is carried out at step S15, the task of the input error-determining processing (S14) and that of the plate-making image-forming processing (step S16) are immediately stopped, and then resumed from the start thereof. In the meanwhile, the display processing (step S12, shown as S12*a* to S12*d*) and the buzzer processing (step S18, shown as S18*a* and S18*b*), further, the sheet processing (step S17, shown as S17*a* and S17*b*) responsive to insertion of the plate-making sheet, are being executed in parallel with the above steps.

In the stamp-making apparatus 1, the stamp image forming method and apparatus are implemented by the control block 300, the operating block 21, and the stamp-detecting block 66. The characteristic operations of the stamp image forming method and apparatus will be described below with reference to FIGS. 18–23.

Figure 18:
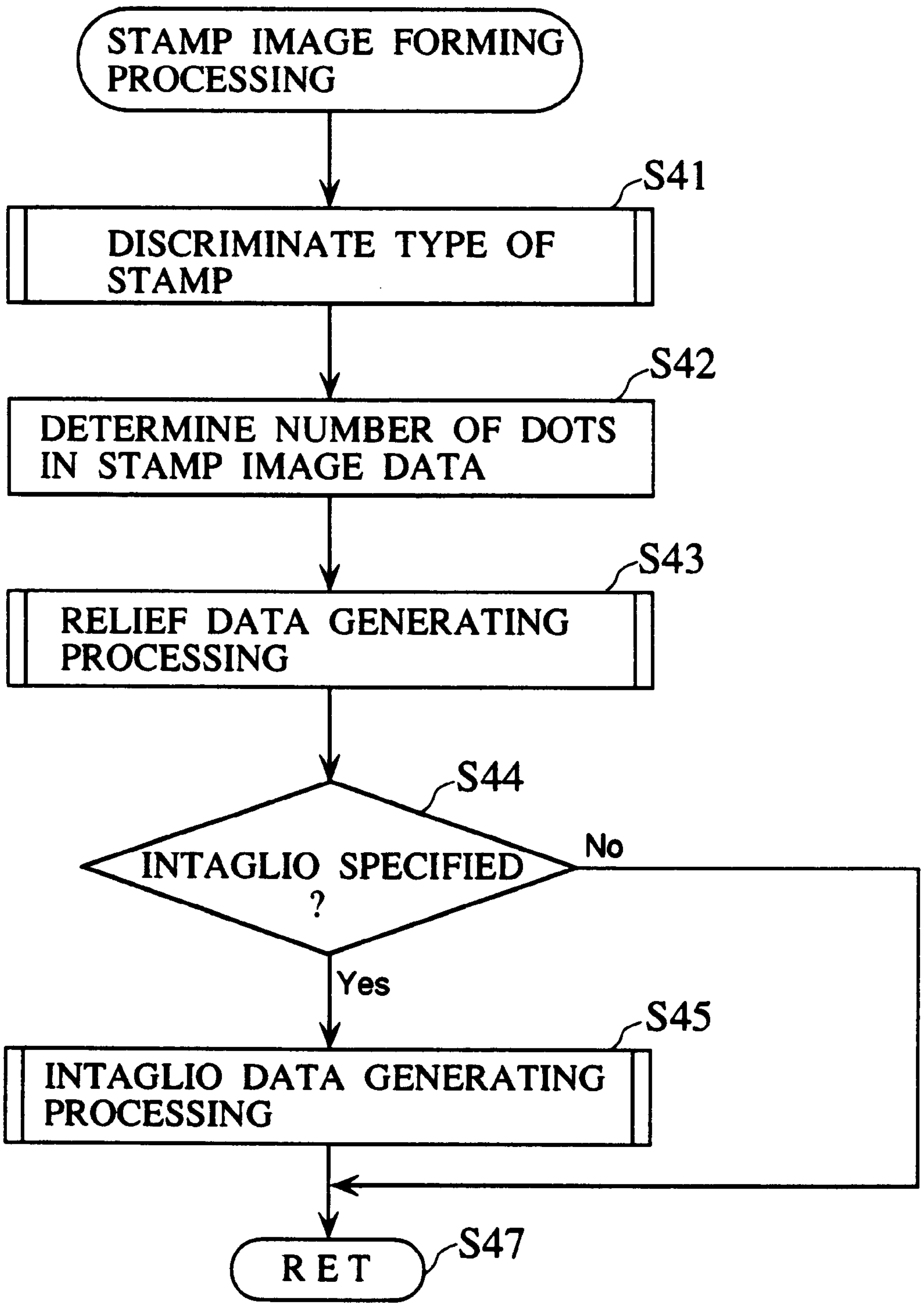
FIG. 18 is a flow chart illustrating a stamp image forming processing according to an embodiment of the present invention.

As illustrated in FIG. 18, the stamp image forming method and the apparatus implementing the method execute stamp image generating processing of the stamp-making apparatus 1. This processing is a subtask initiated from the plate-making image-forming processing (step S16) in the foregoing FIG. 17. Since the plate-making image-forming processing (step S16) is resumed every time a new character or the like is input in the character/symbol-input processing (step S15), the stamp image generating processing is also resumed correspondingly. In addition, the processing at the first two steps of FIG. 18, i.e., stamp type discrimination (step S41) and stamp image data dot number determination (step S42) have been executed in the unit determining processing (step S13) before the stamp image forming processing of interest is started, and intaglio engraving specification (step S44) has been executed in the character/symbol-input processing (step S15). While the processing at these steps are used to only reference information provided thereby, they are included in the flow chart of FIG. 18 for the convenience of explanation.

When the stamp image forming processing is started, the stamp detecting block 66 determines whether or not a stamp body A is set (loaded) and, if set, which type of stamp is set (step S41). Then, the number of dots in stamp image data is determined (step S42), and then relief data is generated (step S43). In the processing at step S43, a relief image defined as standard data is located on image data to generate stamp image data for relief engraving, and the generated stamp image data is stored in a memory. Next, it is determined whether or not intaglio engraving is specified (step S44). When intaglio engraving is specified (step S44: Yes), intaglio data generating processing (step S45), later described, is executed, followed by the termination of the stamp image forming processing. More specifically, intaglio data resulting from the intaglio data generating processing (step S45) is taken as stamp image data when the intaglio engraving is specified (step S44: Yes), while relief data resulting from the relief data generating processing (step S43) is taken as stamp image data when the relief engraving is specified (Step S44: No). Subsequently, the printing processing (step S19) and the exposure processing (step S20) in FIG. 17 are executed.

In specifying the intaglio engraving (step S44), a predetermined push button in the bush button group 22 on the operating block 21 is depressed to display the contents of one of possible options on the display 24, the operating dial 23 is then manipulated to change the display, and the execution key 31 of the operating dial 23 is depressed at the time "Intaglio Engraving" is displayed to specify the intaglio engraving. The contents selected in this event is preserved until the stamp-making apparatus 1 itself is reset.

Figure 19A:
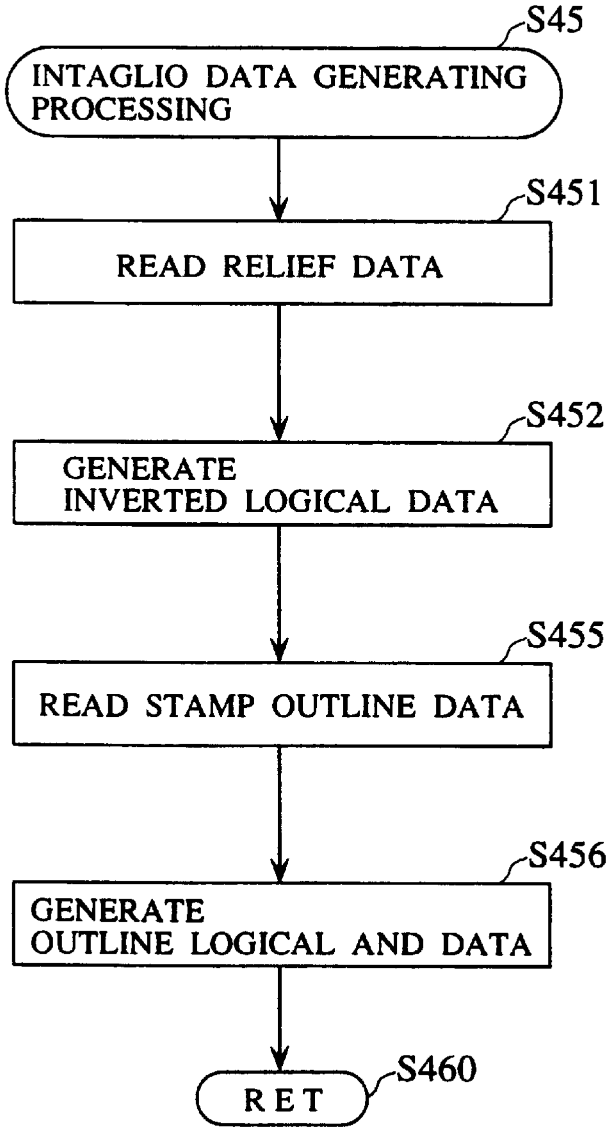
FIG. 19A is a flow chart representing a first example of intaglio data generating processing in the stamp image forming processing of FIG. 18.
Figure 19B:
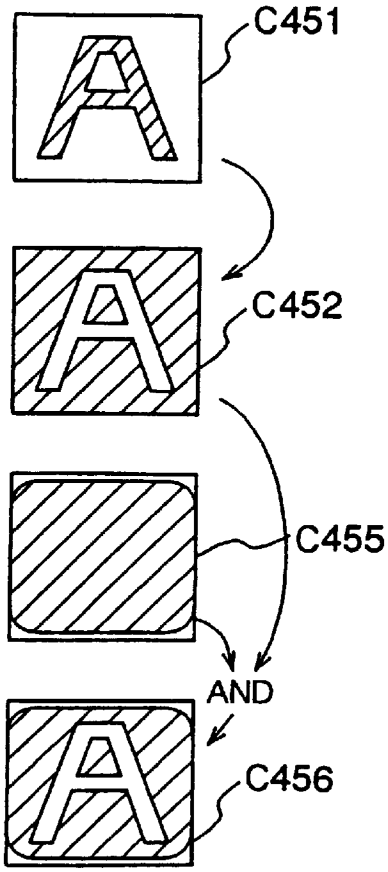
FIG. 19B illustrates a process of changing image data corresponding to the flow chart of FIG. 19A.

In the intaglio data generating processing (step S45) illustrated in FIGS. 19A and 19B, relief data is first read (step S451). For example, if an input character is "A", the relief data generating processing (step S43) generates "A" composed of positive dots corresponding to protrusions of a stamp image of interest on a dot matrix of image data. At step S451, the generated relief data C451 is read. The size of the image data depends on the type of a selected stamp body A and whether or not a stamp frame is used. Since the size of the stamp body A is not related to the feature of the present invention, it is assumed herein that the image data corresponding to a certain size of the stamp body A has been simply generated. It is also assumed hereinafter that processing (Sxxx) and corresponding image data Cxxx are indicated in combination, unless otherwise noted. For example, in FIGS. 19A and 19B, the image data C451, i.e., the read relief data C451 corresponds to the relief data read processing (step S451). Further, a hatched portion in illustrated image data is referred to as a positive dot in an abbreviated form representing dot information on the image dot matrix corresponding to a protrusion of a stamp, while a blank portion is referred to as a negative dot in an abbreviated form representing dot information on the image dot matrix corresponding to a recess of the stamp.

In a first example of the intaglio data generating processing, for example, as illustrated in FIGS. 19A and 19B, after the relief data read processing (step S451) is terminated, next executed at step S452 is to generate inverted logical data C452 by inverting the relationship between the positive dots and the negative dots of the image data C451 retrieved by the relief data read processing (step S451). Next, associated image outline data C455, which represents a portion surrounded by the outline of a stamp-making area of a stamp body A in the form of positive dots, is read corresponding to the type of the stamp body A from a memory in which the data C455 has been previously stored (step S455). Next, a logical AND of mutually corresponding dots of the inverted logical data C452 and of the stamp outline data C455 is taken to generate outline logical AND data C456 (step S456), followed by the termination of the intaglio data generating processing (step S460). In this example, when the intaglio engraving is specified (step S44) in FIG. 18, the outline logical AND data C456 is output as stamp image data, and the subsequent processing, i.e., the printing processing (step S19) and the exposure processing (step S20) in FIG. 17 are executed based on the outline logical AND data C456.

In the first example, even for a stamp having a stamp-making area of a stamp body in a particular shape, for example, a square stamp and so on, positive dots along the outline of the stamp can be deleted by taking a logical AND of the inverted logical data C452 generated based on the relief data C451 and the stamp outline data C456, thus making it possible to generate a stamp image which never overflows from the stamp-making area. In addition, since characters and so on, which are discernible even if a portion thereof is deleted, can be evenly distributed over the entire stamp-making area, it is possible to generate an intaglio image which is good looking, impressive, and profound.

Figure 20A:
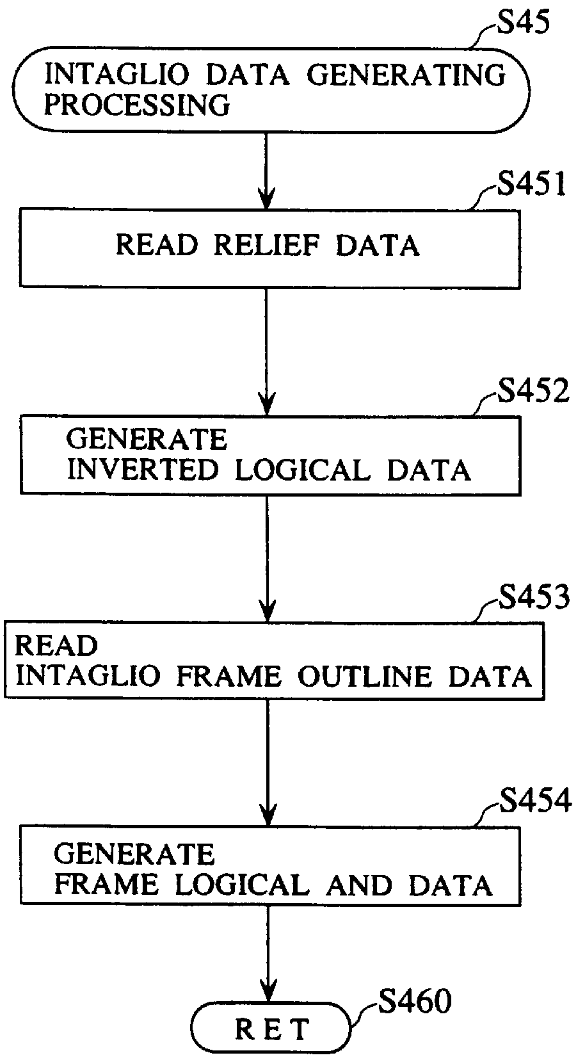
FIGS. 20A and 20B are diagrams similar to FIGS. 19A and 19B, respectively, illustrating a second example of intaglio data generating processing.
Figure 20B:
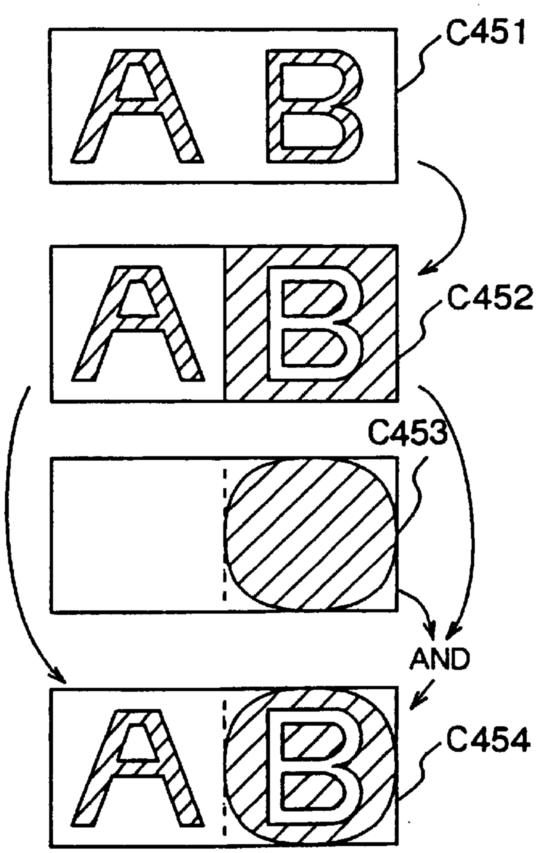

Next, in a second example of the intaglio data generating processing (step S45), for example, as illustrated in FIGS. 20A and 20B, after relief data comprising image data representing two characters "A" and "B" are read (step S451), next executed at step S452 is to generate inverted logical data C452 in which positive dots and negative dots are inverted in a portion of the relief data C451 in which an intaglio is desired (a portion including "B" in FIG. 20B). Next, a previously stored intaglio frame outline data C453 for defining the outline of an intaglio in a region in which the intaglio is to be generated, is read from among a variety of stamp frames prepared in correspondence to different types of the stamp body A. Then, a logical AND of the read intaglio frame outline data C453 and the inverted logical data C452 is taken to generate frame logical AND data C454 (step S454) which is then output as stamp image data, followed by the termination of the processing (step S460).

In the foregoing second example, for example, if an intaglio is desired in a particular portion of a stamp-making area, a stamp image for the intaglio portion can be generated by first creating a shape including a frame of the intaglio and a portion inside thereof, i.e., intaglio frame outline data having the outline of the entire intaglio, and then combining the intaglio frame outline data with relief data. In this event, since a logical AND of an inverted version of the relief data and the intaglio frame outline data is taken, a portion overflowing from the frame of the intaglio can be deleted even if the size of a character or the like is found extremely large when a stamp image is formed, thus making it possible to evenly distribute characters and so on, which are discernible even if a portion thereof is deleted, over the entire area to the proximity of the frame. In this way, an impressive and profound intaglio can be formed. It should be noted that in an alternative embodiment, data on the intaglio frame outline data C453 corresponding to "A" in a relief region may be entirely filled with positive dots such that a logical AND of the entire image data and such intaglio frame outline data C453 is taken in the frame logical AND data generating processing (step S454).

Figure 21A:
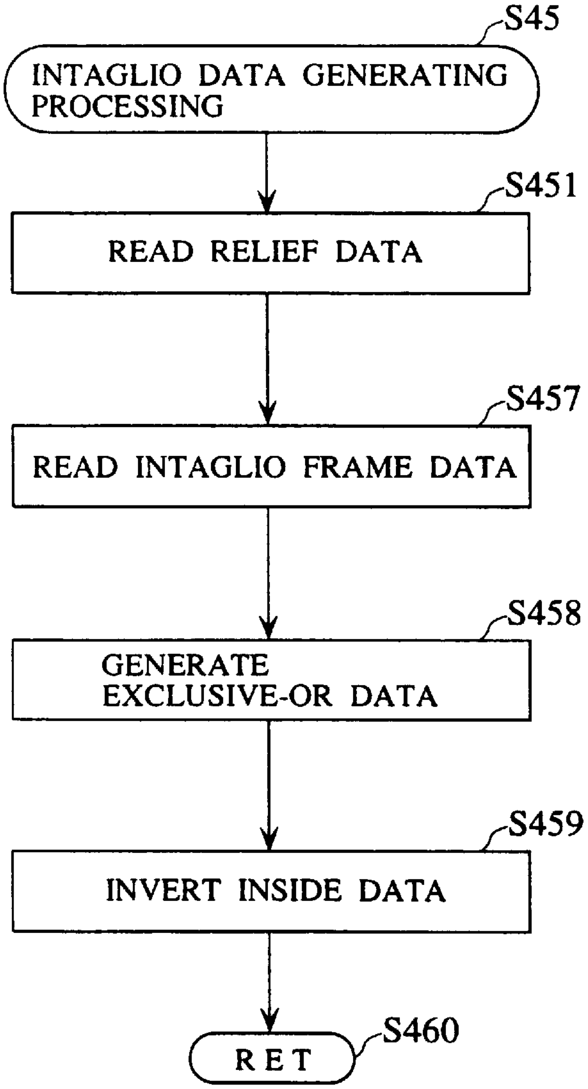
FIGS. 21A and 21B are diagrams similar to FIGS. 19A and 19B, respectively, illustrating a third example of intaglio data generating processing.
Figure 21B:
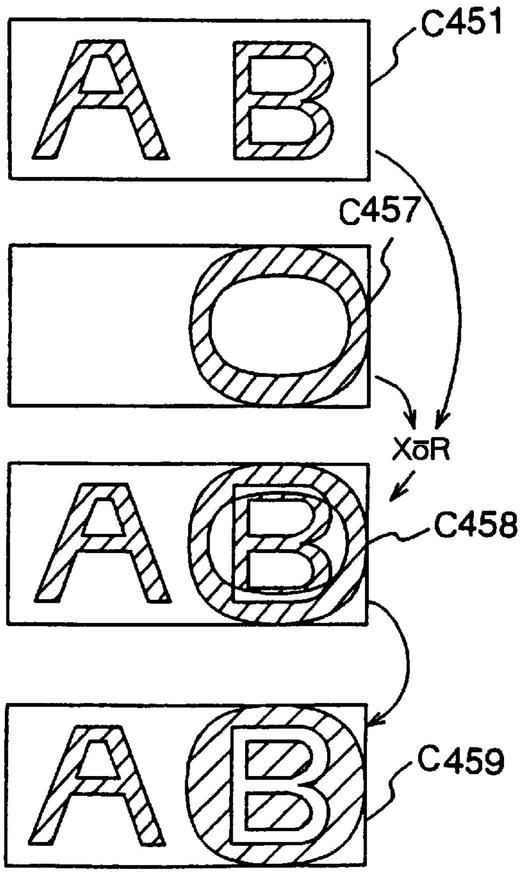

Next, in a third example of the intaglio data generating processing (S45), for example, as illustrated in FIGS. 21A and 21B, after relief data comprising image data representing two characters "A" and "B" is read (step S451), next executed is to read (step S457) previously stored intaglio frame data C457 for defining an intaglio frame having a predetermined width C457 from among a variety of stamp fames prepared in correspondence to different types of the stamp body A for a portion in which an intaglio is formed (a portion including "B" in FIG. 21B) (S457), and to take a logical exclusive-OR of the intaglio frame data C457 and the relief data C451 to generate exclusive logical data C458 (step S458). Subsequently, after the relationship between positive dots and negative dots inside the intaglio frame is inverted (step S459), the inverted data is output as stamp image data, followed by the termination of the processing (step S460).

In the foregoing third example, assuming, for example, that an intaglio is desired in a particular portion of a stamp-making area, a frame may be set for the intaglio and generated as intaglio frame data, such that the intaglio frame data is combined with relief data to generate a stamp image for the intaglio portion. In this event, since the relief data and the intaglio frame data are not combined by a logical OR operation but by a logical exclusive-OR operation, overlapped portions of both the data remain as negative dots, thus making it possible to prevent part of a desired image from being overwritten by the frame.

Figure 22A:
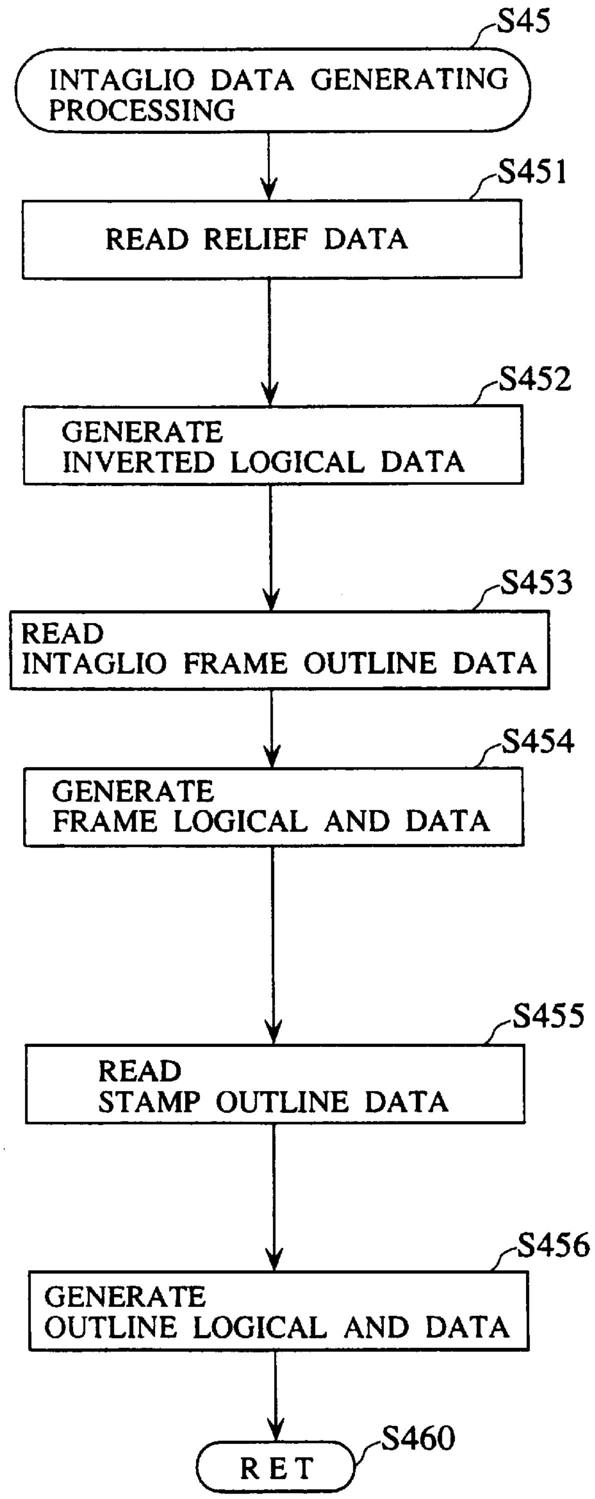
FIGS. 22A and 22B are diagrams similar to FIGS. 19A and 19B, respectively, illustrating a fourth example of intaglio data generating processing.
Figure 22B:
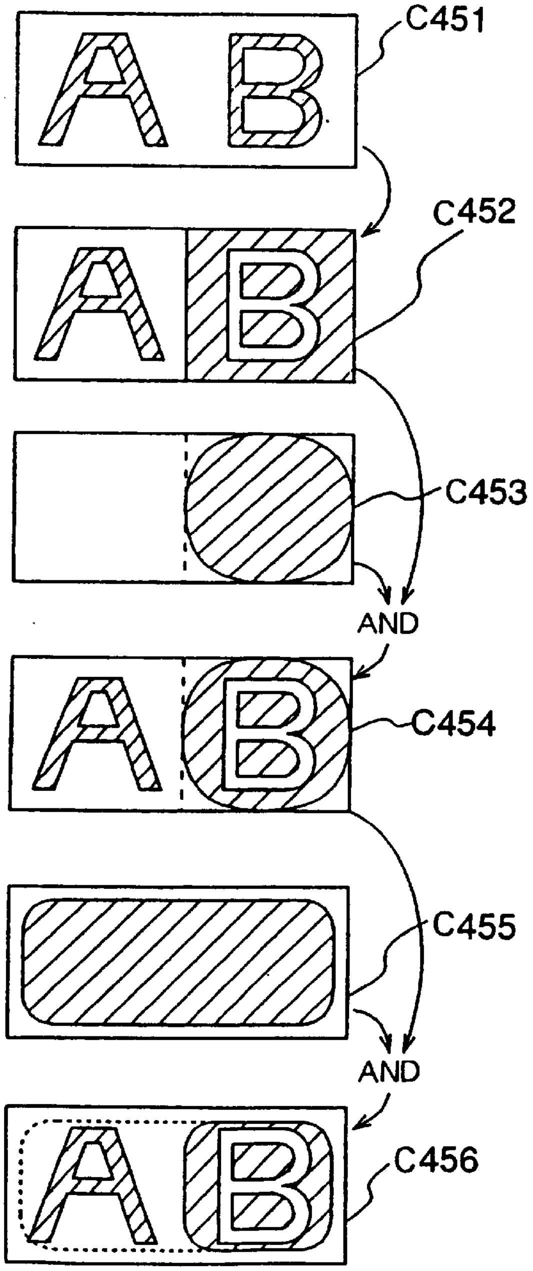

Next, in a fourth example of the intaglio data generating processing (step S45), for example, as illustrated in FIGS. 22A and 22B, after reading relief data (step S451), inverted logical data C452 is generated (step S452). Next, intaglio frame outline data is read (step S453), and thereafter frame logical AND data C454 is generated (step S454). Up to step S454, the processing is similar to the processing in the foregoing second example (FIGS. 20A and 20B). Subsequently, in a manner similar to the foregoing first example (FIGS. 19A and 19B), stamp outline data C455 is read (step S455), outline logical AND data C456 is generated (step S456), and then, the outline logical AND data C456 is output as stamp image data, followed by the termination of the processing (step S460).

Figure 23A:
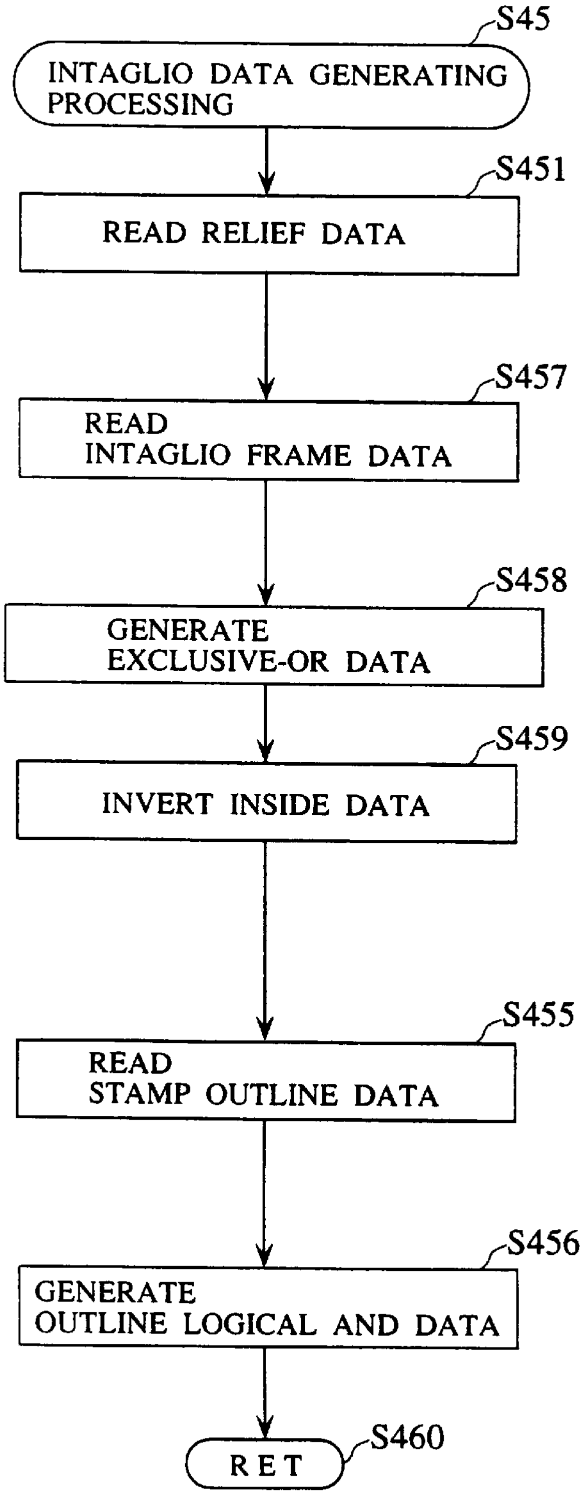
FIGS. 23A and 23B are diagrams similar to FIGS. 19A and 19B, respectively, illustrating a fifth example of intaglio data generating processing.
Figure 23B:
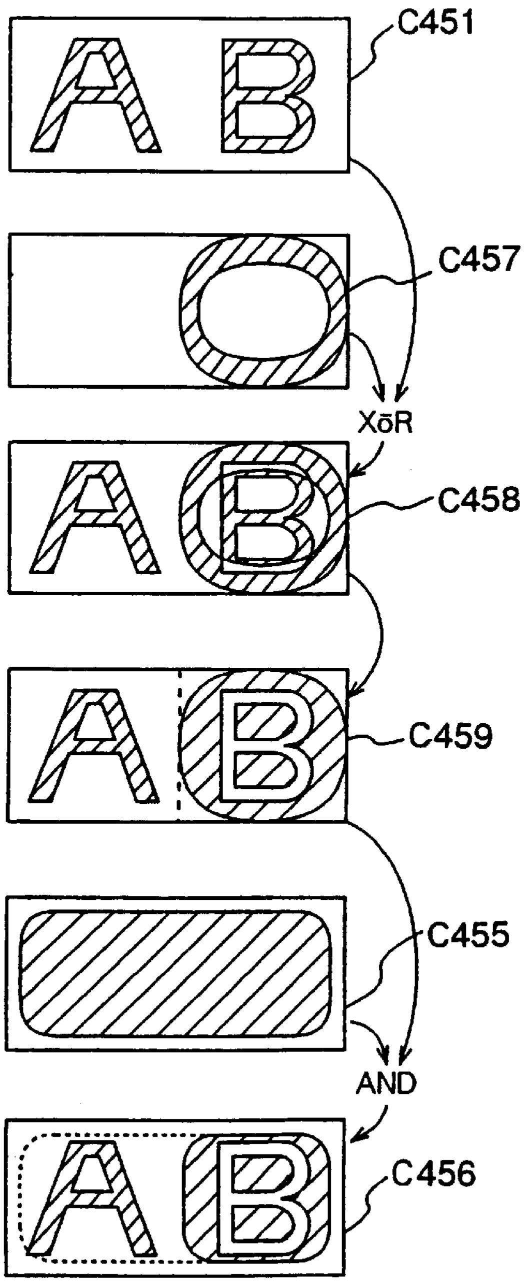

In a fifth example of the intaglio data generating processing (step S45), for example, as illustrated in FIGS. 23A and 23B, after reading relief data (step S451), intaglio frame data C457 is read (step S457), exclusive-OR data C458 is generated (step S458), and then the relationship between positive dots and negative dots inside an intaglio frame is inverted (step S459). The processing up to step S459 is similar to the processing in the foregoing third example (FIGS. 21A and 21B). Subsequently, in a manner similar to the foregoing first example (FIGS. 19A and 19B), stamp outline data C455 is read (step S455), outline logical AND data C456 is generated (step S456), and then, the outline logical AND data C456 is output as stamp image data, followed by the termination of the processing (step S460).

In the fourth and fifth examples, since the stamp image data is generated using the intaglio frame outline data C453 or the intaglio frame data C457 and the stamp outline data, the resulting stamp can have advantages of both the data. Specifically, when a stamp has a stamp-making area in a particular form, or when an intaglio is desired in a particular portion of a stamp-making area, a stamp image partially including an intaglio can be formed while preventing the intaglio from overflowing from the stamp-making area.

As described above, since the stamp image forming method and apparatus utilize the stamp outline data, which is also used for generating a relief corresponding to the type of a used stamp body A, as well as the intaglio frame data or intaglio frame outline data and so on similar to the frame data in the case of the relief, to enable intaglio data to be generated for forming an intaglio based on the relief data serving as the standard data, it is not necessary to prepare a variety of data for forming individual intaglios. Stated another way, the standard data prepared for relief images may be used to generate relief data representing a desired image or a combination of desired images for plate making by the same forming method as that used for conventional relief engraving, and the relief data is relied on to generate intaglio data, thus making it possible to readily form a desired intaglio for a stamp.

After the generation of the stamp image data is completed in the plate-making image-forming processing (step S16) in FIG. 17 including the stamp image generating processing of FIG. 18, the printing processing (step S19) and the exposure processing (step S20), also illustrated in FIG. 17, are executed, with the result that a relief stamp is made when the associated stamp image data is relief data while an intaglio stamp is made when the associated stamp image data is intaglio data.

As previously mentioned as a problem, when an intaglio is formed on a stamp-making area made of a flexible material, or when an image formed of thin lines is engraved for making an intaglio stamp, an affixed stamp tends to be poor. A brief description will be given below in this respect.

Figure 24A:
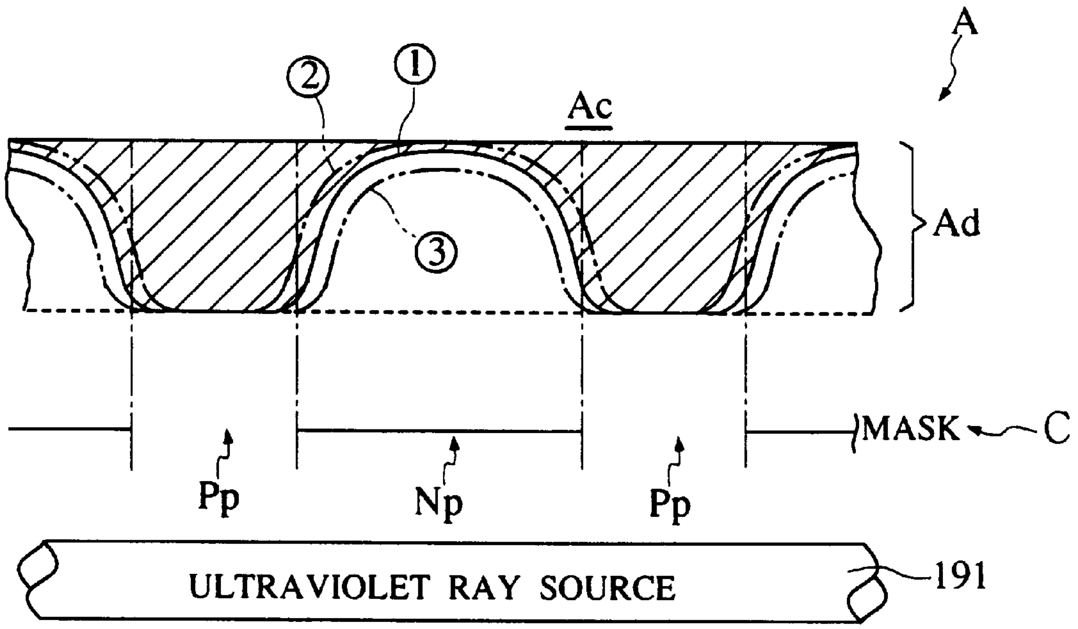
FIG. 24A is a schematic diagram for explaining the relationship between exposure processing and an exposure time and a stamp surface in the relief engraving.

As previously described with reference to FIG. 3, the stamp-making apparatus 1 utilizes a stamp body A which is comprised of a stock Aa, a thin sponge Ab (foamed urethane) affixed to a front end of the stock Aa, a resin base Ac affixed to the sponge Ab, and an ultraviolet-curing resin affixed to the resin base Ac to form a stamp surface Ad. Therefore, the exposure processing (step S20) is conducted in the following manner. Assume that a relief is engraved in this example. As illustrated in FIG. 24A, a portion of the ultraviolet-curing resin (stamp surface Ad) of the stamp body A, which is to be formed with a protrusion, is exposed to ultraviolet rays, through an ink ribbon used as a mask having a positive dot portion Pi of relief data, i.e., a negative image portion of a stamp image from which ink has been peeled off, so as to cure the portion to be formed with a protrusion. Subsequently, the remaining portion, i.e., a recess forming a blank portion other than the relief is washed out to complete a relief engraved stamp (corresponding to ① in FIG. 24A).

In the case of the relief engraving, even if the stamp surface Ad is left exposed to ultraviolet rays for a longer time than a scheduled time, a finished stamp will suffer little actual harm. This is because a negative dot portion Np of the relief data, i.e., a portion not exposed, is sufficiently wider than the exposed positive dot portions Pp, so that the recess is firmly formed (corresponding to ③ in FIG. 24A). The resulting stamp image will rather have a more profoundness. Conversely, even if an exposure time is a bit shorter than the scheduled time to result in a slightly narrower protrusion (corresponding to ② in FIG. 24A), a sufficient urging force applied to a finished stamp will readily compensate for the narrow protrusion. Particularly, when the stamp surface Ad is made of a flexible material such as an ultraviolet-curing resin, the narrow protrusion will not cause grave problems.

Figure 24B:
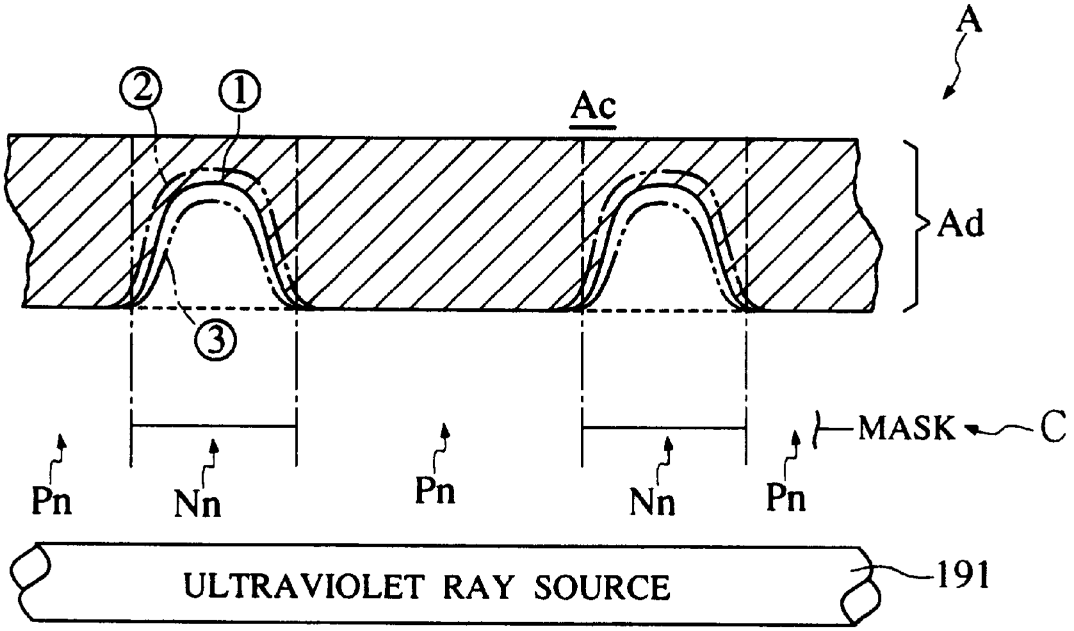
FIG. 24B is a schematic diagram for explaining the relationship between exposure processing and an exposure time and a stamp surface in the intaglio engraving.

On the other hand, the intaglio engraving is quite different from the relief engraving in this respect. When lines forming an intaglio are thin, it is difficult to incise recesses corresponding to the thin lines in a sufficient depth, so that the recesses tends to be shallow. For example, as illustrated in FIG. 24B, assume that ultraviolet rays are irradiated to a portion of a stamp surface Ad which is to be formed with a protrusion corresponding to a blank portion except for the intaglio, through positive dot portions Pn in an intaglio data on a mask C, for curing, and the recess forming the intaglio is washed out to make an intaglio stamp. In this case, since negative dot portions Nn of the intaglio not exposed to ultraviolet rays are narrower than the exposed relief dot portions Pn, the negative dot portions Nn may be affected by the cured relief dot portions adjacent thereto or may not be sufficiently washed out, whereby the recess tends to be shallow (corresponding to ① in FIG. 24B).

In addition, as the stamp surface Ad is exposed for a longer time, this tendency becomes stronger (corresponding to ③ in FIG. 24B). Particularly, when the stamp surface Ad is made of a flexible material, an affixed stamp image will be such that the protrusion representing the blank portion will extend to further reduce the width of the lines forming the intaglio, thus making the stamp image appear poor. It should be noted that these tendencies of the intaglio are generally observed not only when the intaglio stamp is made by exposure of ultraviolet rays but also when it is made by mechanical cutting or other machining.

Thus, in the following, a stamp image forming method for solving the above-mentioned problems to make a stamp having a good-looking intaglio, and an apparatus for implementing the method will be described as another embodiment of the present invention with reference to FIGS. 25 and 26A to 26B.

Figure 25:
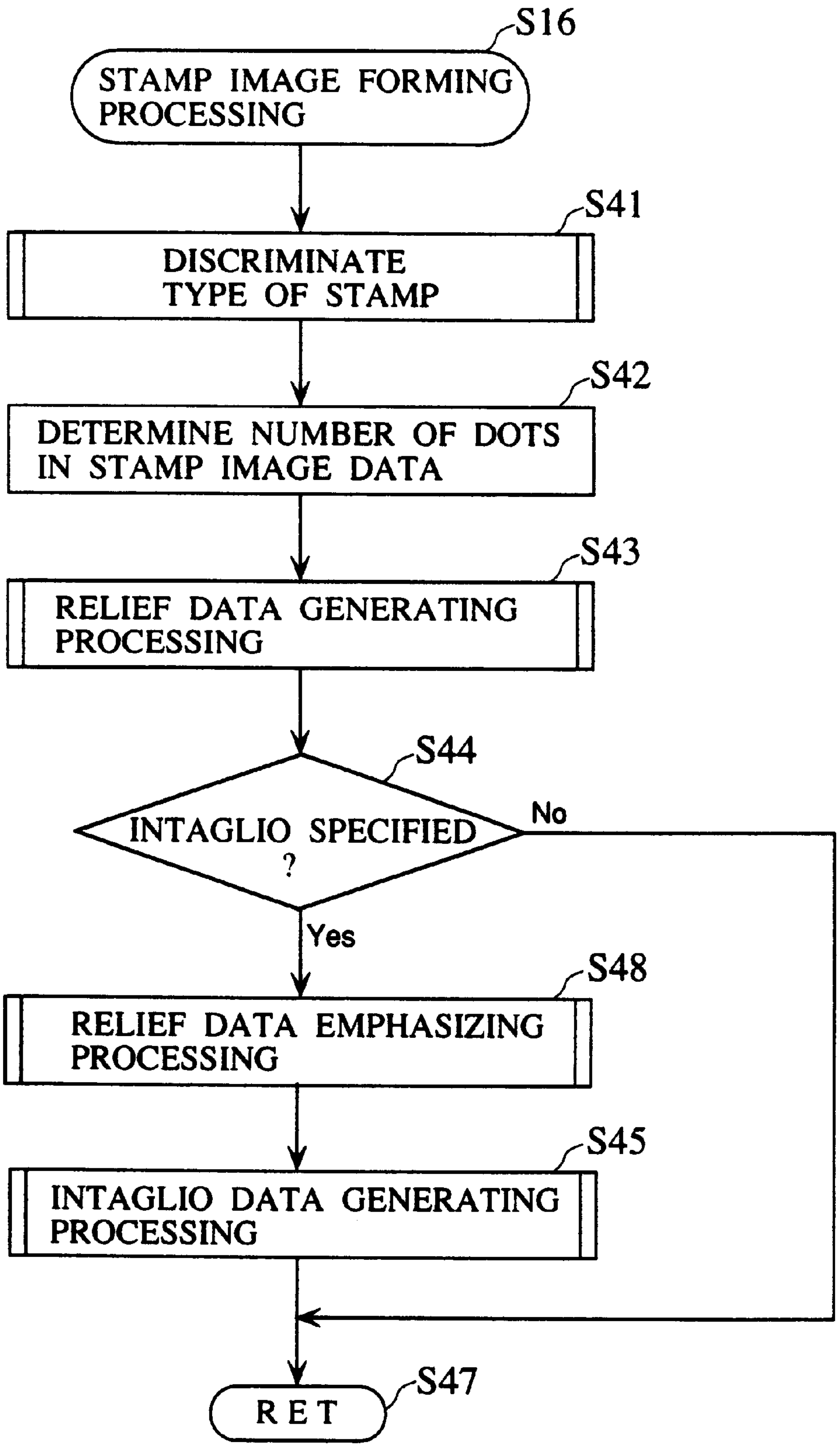
FIG. 25 is a flow chart illustrating stamp image forming processing, similar to FIG. 18, according to another embodiment of the present invention.
Figure 26A:
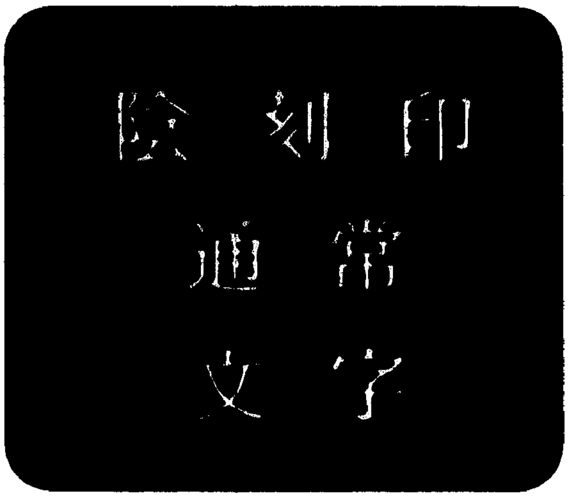
FIG. 26A illustrates an example of an affixed image of a stamp having an intaglio which is formed based on a stamp image composed of thin lines.
Figure 26B:
FIG. 26B illustrates an example of an affixed image of a stamp having an intaglio formed based on a stamp image according to the stamp image forming processing of FIG. 25.

Referring first to FIG. 25, there is illustrated a flow of stamp image forming processing as mentioned above, which is executed in the following manner. At step S44 for determining whether or not intaglio engraving is specified or not in the stamp image forming processing in the aforementioned FIG. 18, if intaglio engraving is specified (step S44: Yes), relief data emphasizing processing (step S48) is to be executed before the intaglio data generating processing (step S45) in the aforementioned FIGS. 19A to 23B. In the relief data emphasizing processing (step S48), stamp image data for relief engraving (see the image data C451 in FIGS. 19A to 23B) generated in the relief data generating processing (step S43) is relied on as relief basic data. A positive dot group corresponding to protrusions of the relief basic data is extended to generate new relief data which represents a stamp image with fatter lines than the lines of the relief basic data, i.e., which represents an emphasized image in the form of positive dots. The new relief data is stored as image data C451.

The extension of the positive dot group in the relief data emphasizing processing (step S48) can be readily realized by overlapping the positive dot group on the relief basic data, wherein the positive dot group has priority over the relief basic data. Specifically, for this overlapping operation, a copy of the relief basic data is displaced dot by dot in a direction in which lines are extended, i.e., in the left, right, upward, downward, or diagonal direction to generate one or two sets of new image data, and a logical OR of corresponding dots of the new image data and the positive dot group is taken. Then, the aforementioned intaglio forming processing described in connection with FIGS. 19A to 23B is executed based on the new relief data C451 representing the emphasized image emphasized by the extension so that a negative dot group corresponding to recesses of intaglio data for forming an intaglio can be modified such that the resulting recesses of the intaglio are extended.

It will be appreciated from the foregoing that the stamp image forming method and apparatus of this embodiment are advantageous in eliminating the need for preparing a variety of data for forming individual intaglios as well as in forming a good-looking intaglio for a stamp which will provide a good-looking and profound image when affixed. As a result, even when an intaglio is formed in a stamp-making area made of a flexible material or even when a stamp image formed of thin lines is engraved to form an intaglio (see FIG. 26A), a good-looking intaglio can ge formed (see FIG. 26B). It should be noted that the relief data generated as described above may be stored as new standard data for extending its utilization area to a wide variety of applications.

As an alternative method for making an intaglio more attractive, a machining method applied to the stamp-making may be improved in addition to the improvement in the stamp image forming method. Furthermore, a combination of the improvements in the stamp machining and the stamp image forming techniques will be more effective.

Figure 27:
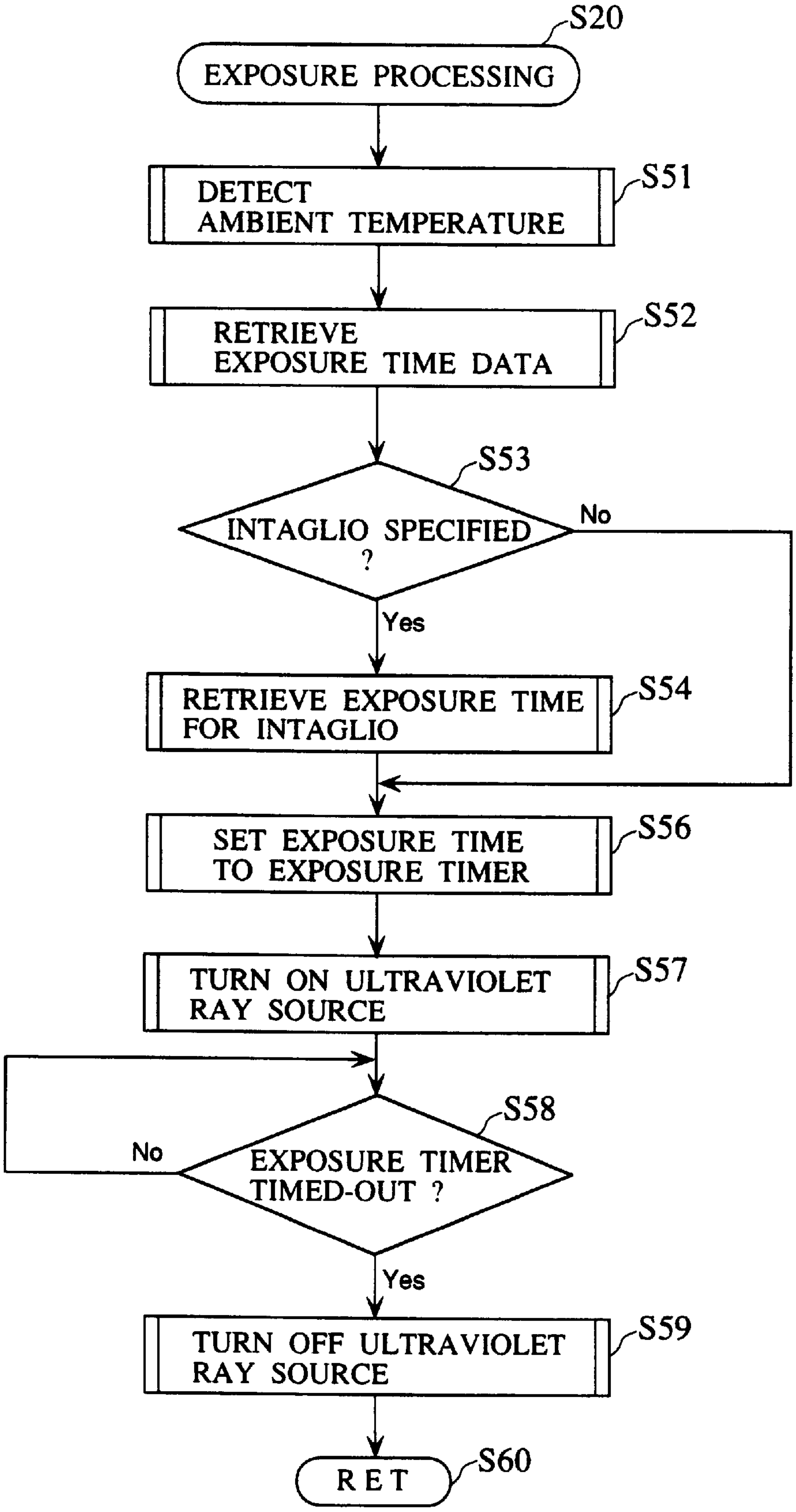
FIG. 27 is a flow chart representing exposure processing conducted in a stamp-making apparatus according to an embodiment of the present invention.
Figure 28A:
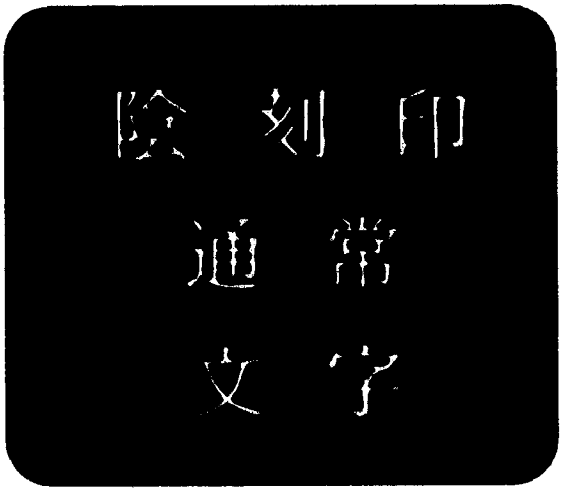
FIG. 28A illustrates an example of an affixed image of a stamp having an intaglio formed by the exposure processing conducted for a normal exposure time.
Figure 28B:
FIG. 28B illustrates an example of an affixed image of a stamp having an intaglio formed by the exposure processing of FIG. 27.

Therefore, a processing method for making an intaglio more attractive in the exposure processing (step S20) in FIG. 17, employed in a stamp image forming apparatus 1 as a stamp machining method, will be described below with reference to FIGS. 27 and 28A to 28B.

Based on stamp image data generated in the stamp image forming processing in FIG. 18 or FIG. 25, a mask comprising an ink ribbon C formed with a negative image of a stamp image is produced by the printing processing (step S19) in FIG. 17. The produced ink ribbon C is sent to the exposure block 67 (see FIGS. 5, 11, and 24), and then the exposure processing (step S20) is started. When the exposure processing (step S20) is started, the ambient temperature sensor 67 first detects an ambient temperature around the exposure block 65 (step S51), and exposure time data is retrieved from the RAM 303 in accordance with the detected ambient temperature. The exposure time data is retrieved with reference to an exposure time table in accordance with the detected ambient temperature (step S52). The exposure time table defines exposure times corresponding to ambient temperatures for making general relief stamps.

After retrieving the exposure time data (step S52), it is determined whether or not intaglio engraving is specified (step S53). When intaglio engraving is specified (step S53: Yes), exposure time data for intaglio engraving is retrieved and exchanged with the exposure time data for relief engraving (step S54). Conversely, if intaglio engraving is not specified (step S53: No), the exposure data for relief engraving is used as it is. An exposure time indicated by the exposure time data for intaglio engraving is generally set shorter than an exposure time for relief engraving. For example, the former is approximately 30 seconds when the latter is 90 seconds at a room temperature.

Next, the selected exposure time data is set to an exposure timer (step S56), and an ultraviolet ray source 191 is turned on (step S57). It is next determined whether or not the exposure timer is timed out (step S58). The ultraviolet ray source 191 continuously emits ultraviolet rays as long as time-out of the exposure timer is not determined (S58: No), and is turned off when the set exposure time is expired (step S59), followed by the termination of the exposure processing (step S60). Briefly, the exposure block 65 exposes the stamp face to ultraviolet rays for a set exposure time. By this exposure processing, the portion of the stamp surface Ad to be formed with protrusions are cured depending on the exposure time set therefor, and remains on the stamp surface Ad after the stamp body is washed, as has been previously described with reference to FIG. 24.

As mentioned above, the exposure time for intaglio engraving (extension exposure time) is set shorter than the exposure time for relief engraving, so that when the intaglio engraving is specified (S53: Yes), an increased portion of the stamp surface Ad remains uncured after the exposure processing, and is washed out in the subsequent wash-out. In this way, protrusions cured by ultraviolet rays are reduced and will exert less influence on adjacent recesses. As a result, the recesses of the intaglio are extended (see FIG. 28B) as compared with the case where a stamp surface is exposed for a normal exposure time for relief engraving (see FIG. 28A). As will be appreciated from the foregoing, according to the exposure processing conducted by the stamp-making apparatus 1, a longer exposure time is selected for extending recesses of an intaglio when the exposure processing is conducted for forming the intaglio, thus making it possible to readily form an intaglio having wider recesses, i.e., a good-looking intaglio emphasized by extended lines.

While the present invention has been specifically described with reference to a preferred embodiment thereof, it will be understood by those skilled in the art that a variety of modifications may be made without departing from the spirit and scope of the present invention.

What is claimed is:

1. A method of producing a mask for photographic generation of a stamp, the mask containing an image of a pattern having raised portions and blank portions, said method comprising:

in a relief data storing step, storing relief data representing a matrix of image elements of the image, the data having a positive value for each image element located at a raised portion and a negative value for each image element located at a blank portion;

in an intaglio data generating step, generating intaglio data having a negative value for each image element located at a raised portion and a positive value for each image element located at a blank portion; the intaglio data generating step including a step of storing frame data representing a frame or outline within an area in which an intaglio is produced, wherein the intaglio data is generated by inverting the stored relief data and performing a logic operation on the inverted relief data and the stored frame data; and in a mask producing step, producing the mask for photographic generation of the stamp by forming a pattern of transparent areas and opaque areas on a sheet using at least one of the relief data and the intaglio data.

2. The method according to claim 1 wherein said intaglio data generating step comprises:

inverting the relationship between the relief data having positive values and the data having negative values for each image element to produce basic intaglio data;

storing stamp outline data representing an outline of the stamp pattern surrounding an inner area of the stamp, the stamp outline data having a positive value for each image element forming part of the outline and a negative value for each image element located outside of the outline; and generating the intaglio data, by performing, for each image element, a logical AND operation between the basic intaglio data and the stamp outline data.

3. The method according to claim 1 wherein said intaglio data generating step comprises:

inverting the relationship between the relief data having positive values and the data having negative values for each image element to produce inverted logical data;

storing intaglio frame outline data representing an intaglio frame enclosing an area, the intaglio frame outline data having a positive value for each image element enclosed by the frame and a negative value for each image element outside the frame; and generating the intaglio data by performing, for each image element, a logical AND operation between the inverted logical data and the intaglio frame outline data.

4. The method according to claim 1 wherein said intaglio data generating step comprises:

storing intaglio frame data representing an intaglio frame having a given width and enclosing an area, the intaglio frame data having a positive value for each image element of the intaglio frame and a negative value for each image element of the area enclosed by the intaglio frame;

generating logical exclusive-OR data by performing, for each image element, a logical exclusive-OR operation between the relief data and the intaglio frame data; and inverting the relationship between the exclusive-OR data having positive values and the exclusive-OR data having negative values for each image element of the area enclosed by the intaglio frame.

5. The method according to claim 1 wherein said intaglio data generating step comprises:

inverting the relationship between the relief data having positive values and the relief data having negative values for each image element to produce inverted logical data;

storing intaglio frame outline data representing an intaglio frame enclosing an area, the intaglio frame outline data having a positive value for each image element enclosed by the frame and a negative value for each image element outside the frame;

generating the basic intaglio data by performing, for each image element, a logical AND operation between the inverted logical data and the intaglio frame outline data;

storing stamp outline data representing an outline of the stamp pattern surrounding an inner area of the stamp, the stamp outline data having a positive value for each image element forming part of the outline and a negative value for each image element located outside of the outline; and generating the intaglio data, by performing, for each image element, a logical AND operation between the basic intaglio data and the stamp outline data.

6. The method according to claim 1 wherein said intaglio data generating step comprises:

storing intaglio frame data representing an intaglio frame having a given width and enclosing an area, the intaglio frame data having a positive value for each image element of the intaglio frame and a negative value for each image element of the area enclosed by the intaglio frame;

generating logical exclusive-OR data by performing, for each image element, a logical exclusive-OR operation between the relief data and the intaglio frame data;

inverting the relationship between the exclusive-OR data having positive values and the exclusive-OR data having negative values for each image element of the area enclosed by the intaglio frame;

storing stamp outline data representing an outline of the stamp pattern surrounding an inner area of the stamp, the stamp outline data having a positive value for each image element forming part of the outline and a negative value for each image element located outside of the outline; and generating the intaglio data, by performing, for each image element, a logical AND operation between the data produced in said inverting step and the stamp outline data.

7. A method of producing a mask for photographic generation of a stamp, the mask containing an image of a pattern having raised portions and blank portions, said method comprising:

in a relief data storing step, storing relief data representing a matrix of image elements of the image, the data having a positive value for each image element located at a raised portion and a negative value for each image element located at a blank portion;

in an intaglio data generating step, reading the relief data and generating, from the relief data, intaglio data having a negative value for each image element located at a raised portion and a positive value for each image element located at a blank portion and in a mask producing step producing the mask for photographic generation of the stamp by forming a pattern of transparent areas and opaque areas on a sheet using at least one of the relief data and the intaglio data, wherein said relief data storing step comprises storing basic relief data representing the matrix of image elements, and then generating, from the basic relief data, emphasized relief data representing a matrix of image elements representing an image composed of raised portions which are extended relative to the raised portions of the matrix of image elements represented by the basic relief data, the emphasized relief data having a positive value for each image element located at an extended raised portion and a negative value for each image element located at a blank portion, and the emphasized relief data being used as the relief data in the intaglio data generating and mask producing steps.

8. The method according to claim 7 wherein said intaglio data generating step comprises:

inverting the relationship between the relief data having positive values and the data having negative values for each image element to produce basic intaglio data;

storing stamp outline data representing an outline of the stamp pattern surrounding an inner area of the stamp, the stamp outline data having a positive value for each image element forming part of the outline and a negative value for each image element located outside of the outline; and generating the intaglio data, by performing, for each image element, a logical AND operation between the basic intaglio data and the stamp outline data.

9. The method according to claim 7 wherein said intaglio data generating step comprises:

inverting the relationship between the relief data having positive values and the data having negative values for each image element to produce inverted logical data;

storing intaglio frame outline data representing an intaglio frame enclosing an area, the intaglio frame outline data having a positive value for each image element enclosed by the frame and a negative value for each image element outside the frame; and generating the intaglio data by performing, for each image element, a logical AND operation between the inverted logical data and the intaglio frame outline data.

10. The method according to claim 7 wherein said intaglio data generating step comprises:

storing intaglio frame data representing an intaglio frame having a given width and enclosing an area, the intaglio frame data having a positive value for each image element of the intaglio frame and a negative value for each image element of the area enclosed by the intaglio frame;

generating logical exclusive-OR data by performing, for each image element, a logical exclusive-OR operation between the relief data and the intaglio frame data; and inverting the relationship between the exclusive-OR data having positive values and the exclusive-OR data having negative values for each image element of the area enclosed by the intaglio frame.

11. The method according to claim 7 wherein said intaglio data generating step comprises:

inverting the relationship between the relief data having positive values and the relief data having negative values for each image element to produce inverted logical data;

storing intaglio frame outline data representing an intaglio frame enclosing an area, the intaglio frame outline data having a positive value for each image element enclosed by the frame and a negative value for each image element outside the frame;

generating the basic intaglio data by performing, for each image element, a logical AND operation between the inverted logical data and the intaglio frame outline data;

storing stamp outline data representing an outline of the stamp pattern surrounding an inner area of the stamp, the stamp outline data having a positive value for each image element forming part of the outline and a negative value for each image element located outside of the outline; and generating the intaglio data, by performing, for each image element, a logical AND operation between the basic intaglio data and the stamp outline data.

12. The method according to claim 7 wherein said intaglio data generating step comprises:

storing intaglio frame data representing an intaglio frame having a given width and enclosing an area, the intaglio frame data having a positive value for each image element of the intaglio frame and a negative value for each image element of the area enclosed by the intaglio frame;

generating logical exclusive-OR data by performing, for each image element, a logical exclusive-OR operation between the relief data and the intaglio frame data;

inverting the relationship between the exclusive-OR data having positive values and the exclusive-OR data having negative values for each image element of the area enclosed by the intaglio frame;

storing stamp outline data representing an outline of the stamp pattern surrounding an inner area of the stamp, the stamp outline data having a positive value for each image element forming part of the outline and a negative value for each image element located outside of the outline; and generating the intaglio data, by performing, for each image element, a logical AND operation between the data produced in said inverting step and the stamp outline data.

13. Apparatus for producing a mask for photographic generation of a stamp, the mask containing an image of a pattern having raised portions and blank portions, said apparatus comprising:

relief data storing means for storing relief data representing a matrix of image elements of the image, the data having a positive value for each image element located at a raised portion and a negative value for each image element located at a blank portion;

intaglio data generating means for generating intaglio data having a negative value for each image element located at a raised portion and a positive value for each image element located at a blank portion; the intaglio data generating means including means for storing frame data representing a frame or outline within an area in which an intaglio is produced, wherein the intaglio data is generated by inverting the stored relief data and performing a logic operation on the inverted relief data and the stored frame data; and mask producing means for producing the mask for photographic generation of the stamp by forming a pattern of transparent areas and opaque areas on a sheet using at least one of the relief data and the intaglio data.

14. The apparatus according to claim 13 wherein said intaglio data generating means comprises:

means for inverting the relationship between the relief data having positive values and the data having negative values for each image element to produce basic intaglio data;

means for storing stamp outline data representing an outline of the stamp pattern surrounding an inner area of the stamp, the stamp outline data having a positive value for each image element forming part of the outline and a negative value for each image element located outside of the outline; and means for generating the intaglio data, by performing, for each image element, a logical AND operation between the basic intaglio data and the stamp outline data.

15. The apparatus according to claim 13 wherein said intaglio data generating means comprises:

means for inverting the relationship between the relief data having positive values and the data having negative values for each image element to produce inverted logical data;

means for storing intaglio frame outline data representing an intaglio frame enclosing an area, the intaglio frame outline data having a positive value for each image element enclosed by the frame and a negative value for each image element outside the frame; and means for generating the intaglio data by performing, for each image element, a logical AND operation between the inverted logical data and the intaglio frame outline data.

16. The apparatus according to claim 13 wherein said intaglio data generating means comprises:

means for storing intaglio frame data representing an intaglio frame having a given width and enclosing an area, the intaglio frame data having a positive value for each image element of the intaglio frame and a negative value for each image element of the area enclosed by the intaglio frame;

means for generating logical exclusive-OR data by performing, for each image element, a logical exclusive-OR operation between the relief data and the intaglio frame data; and means for inverting the relationship between the exclusive-OR data having positive values and the exclusive-OR data having negative values for each image element of the area enclosed by the intaglio frame.

17. The apparatus according to claim 13 wherein said intaglio data generating means comprises:

means for inverting the relationship between the relief data having positive values and the relief data having negative values for each image element to produce inverted logical data;

means for storing intaglio frame outline data representing an intaglio frame enclosing an area, the intaglio frame outline data having a positive value for each image element enclosed by the frame and a negative value for each image element outside the frame;

means for generating the basic intaglio data by performing, for each image element, a logical AND operation between the inverted logical data and the intaglio frame outline data;

means for storing stamp outline data representing an outline of the stamp pattern surrounding an inner area of the stamp, the stamp outline data having a positive value for each image element forming part of the outline and a negative value for each image element located outside of the outline; and means for generating the intaglio data, by performing, for each image element, a logical AND operation between the basic intaglio data and the stamp outline data.

18. The apparatus according to claim 13 wherein said intaglio data generating means comprises:

means for storing intaglio frame data representing an intaglio frame having a given width and enclosing an area, the intaglio frame data having a positive value for each image element of the intaglio frame and a negative value for each image element of the area enclosed by the intaglio frame;

means for generating logical exclusive-OR data by performing, for each image element, a logical exclusive-OR operation between the relief data and the intaglio frame data;

means for inverting the relationship between the exclusive-OR data having positive values and the exclusive-OR data having negative values for each image element of the area enclosed by the intaglio frame;

means for storing stamp outline data representing an outline of the stamp pattern surrounding an inner area of the stamp, the stamp outline data having a positive value for each image element forming part of the outline and a negative value for each image element located outside of the outline; and means for generating the intaglio data, by performing, for each image element, a logical AND operation between the data produced in said inverting means and the stamp outline data.

19. Apparatus for producing a mask for photographic generation of a stamp, the mask containing an image of a pattern having raised portions and blank portions, said apparatus comprising:

relief data storing means for storing relief data representing a matrix of image elements of the image, the data having a positive value for each image element located at a raised portion and a negative value for each image element located at a blank portion;

intaglio data generating means for reading the relief data and generating, from the relief data, intaglio data having a negative value for each image element located at a raised portion and a positive value for each image element located at a blank portion; and mask producing means for producing the mask for photo graphic generation of the stamp by forming a pattern of transparent areas and opaque areas on a sheet using at least one of the relief data and the intaglio data, wherein said relief data storing means comprises means for storing basic relief data representing the matrix of image elements, and then generating, from the basic relief data, emphasized relief data representing a matrix of image elements representing an image composed of raised portions which are extended relative to the raised portions of the matrix of image elements represented by the basic relief data, the emphasized relief data having a positive value for each image element located at an extended raised portion and a negative value for each image element located at a blank portion, and the emphasized relief data being used as the relief data by said intaglio data generating and mask producing means.

20. The apparatus according to claim 19 wherein said intaglio data generating means comprises:

means for inverting the relationship between the relief data having positive values and the data having negative values for each image element to produce basic intaglio data;

means for storing stamp outline data representing an outline of the stamp pattern surrounding an inner area of the stamp, the stamp outline data having a positive value for each image element forming part of the outline and a negative value for each image element located outside of the outline; and means for generating the intaglio data, by performing, for each image element, a logical AND operation between the basic intaglio data and the stamp outline data.

21. The apparatus according to claim 19 wherein said intaglio data generating means comprises:

means for inverting the relationship between the relief data having positive values and the data having negative values for each image element to produce inverted logical data;

means for storing intaglio frame outline data representing an intaglio frame enclosing an area, the intaglio frame outline data having a positive value for each image element enclosed by the frame and a negative value for each image element outside the frame; and means for generating the intaglio data by performing, for each image element, a logical AND operation between the inverted logical data and the intaglio frame outline data.

22. The apparatus according to claim 19 wherein said intaglio data generating means comprises:

means for storing intaglio frame data representing an intaglio frame having a given width and enclosing an area, the intaglio frame data having a positive value for each image element of the intaglio frame and a negative value for each image element of the area enclosed by the intaglio frame;

means for generating logical exclusive-OR data by performing, for each image element, a logical exclusive-OR operation between the relief data and the intaglio frame data; and means for inverting the relationship between the exclusive-OR data having positive values and the exclusive-OR data having negative values for each image element of the area enclosed by the intaglio frame.

23. The apparatus according to claim 19 wherein said intaglio data generating means comprises:

means for inverting the relationship between the relief data having positive values and the relief data having negative values for each image element to produce inverted logical data;

means for storing intaglio frame outline data representing an intaglio frame enclosing an area, the intaglio frame outline data having a positive value for each image element enclosed by the frame and a negative value for each image element outside the frame;

means for generating the basic intaglio data by performing, for each image element, a logical AND operation between the inverted logical data and the intaglio frame outline data;

means for storing stamp outline data representing an outline of the stamp pattern surrounding an inner area of the stamp, the stamp outline data having a positive value for each image element forming part of the outline and a negative value for each image element located outside of the outline; and means for generating the intaglio data, by performing, for each image element, a logical AND operation between the basic intaglio data and the stamp outline data.

24. The apparatus according to claim 19 wherein said intaglio data generating means comprises:

means for storing intaglio frame data representing an intaglio frame having a given width and enclosing an area, the intaglio frame data having a positive value for each image element of the intaglio frame and a negative value for each image element of the area enclosed by the intaglio frame;

means for generating logical exclusive-OR data by performing, for each image element, a logical exclusive-OR operation between the relief data and the intaglio frame data;

means for inverting the relationship between the exclusive-OR data having positive values and the exclusive-OR data having negative values for each image element of the area enclosed by the intaglio frame;

means for storing stamp outline data representing an outline of the stamp pattern surrounding an inner area of the stamp, the stamp outline data having a positive value for each image element forming part of the outline and negative value for each image element located outside of the outline; and means for generating the intaglio data, by performing, for each image element, a logical AND operation between the data produced in said inverting means and the stamp outline data.

25. A stamp-making apparatus for making a stamp, said stamp making apparatus having an apparatus body in which a stamp body is removably loaded, said stamp body having a stamp-making portion on which a stamp image is engraved, said stamp-making apparatus comprising:

relief data storing means for storing relief data representing a matrix of image elements of the image, the data having a positive value for each image element located at a raised portion and a negative value for each image element located at a blank portion;

intaglio data generating means for generating intaglio data having a negative value for each image element located at a raised portion and a positive value for each image element located at a blank portion; the intaglio data generating step including a step of storing frame data representing a frame or outline within an area in which an intaglio is produced, wherein the intaglio data is generated by inverting the stored relief data and performing a logic operation on the inverted relief data and the stored frame data; and stamp-making means for engraving an intaglio on said stamp-making portion of said stamp body removably loaded in said apparatus body based on said intaglio data generated by said intaglio data generating means.

26. A stamp-making apparatus for making a stamp, said stamp making apparatus having an apparatus body in which a stamp body is removably loaded, said stamp body having a stamp-making portion on which a stamp image is engraved, said stamp-making apparatus comprising:

relief data storing means for storing relief data representing a matrix of image elements of the image, the data having a positive value for each image element located at a raised portion and a negative value for each image element located at a blank portion;

intaglio data generating means for reading the relief data and generating, from the relief data, intaglio data having a negative value for each image element located at a raised portion and a positive value for each image element located at a blank portion; and stamp-making means for engraving an intaglio on said stamp-making portion of said stamp body removably loaded in said apparatus body based on said intaglio data generated by said intaglio data generating means, wherein said relief data storing means comprises means for storing basic relief data representing the matrix of image elements, and then generating, from the basic relief data, emphasized relief data representing a matrix of image elements representing an image composed of raised portions which are extended relative to the raised portions of the matrix of image elements represented by the basic relief data, the emphasized relief data having a positive value for each image element located at an extended raised portion and a negative value for each image element located at a blank portion, and the emphasized relief data being used as the relief data by said intaglio data generating means.

27. The stamp-making apparatus according to claim 26, wherein:

said stamp-making portion of said stamp body is made of a light-sensitive resin; and said stamp-making means includes:

exposure time storing means for storing a plurality of exposure times;

exposure time selecting means for selecting from said plurality of exposure times an extended exposure time for extending recesses formed in said stamp-making portion at locations corresponding to image elements for which said intaglio data have negative values; and exposing means for engraving an intaglio on said stamp-making portion of said stamp body by an exposure in accordance with said extended exposure time.

28. A stamp-making apparatus for making a stamp, said stamp making apparatus having an apparatus body in which a stamp body is removably loaded, said stamp body having a stamp-making portion on which a stamp image is engraved, said stamp-making apparatus comprising:

relief data storing means for storing relief data representing a matrix of image elements of the image, the data having a positive value for each image element located at a raised portion and a negative value for each image element located at a blank portion;

intaglio data generating means for reading the relief data and generating, from the relief data, intaglio data having a negative value for each image element located at a raised portion and a positive value for each image element located at a blank portion; and stamp-making means for engraving an intaglio on said stamp-making portion of said stamp body removably loaded in said apparatus body based on said intaglio data generated by said intaglio data generating means wherein:

said stamp-making portion of said stamp body is made of a light-sensitive resin; and said stamp-making means includes:

exposure time storing means for storing a plurality of exposure times;

exposure time selecting means for selecting from said plurality of exposure times an extended exposure time for extending recesses formed in said stamp-making portion at locations corresponding to image elements for which said intaglio data have negative values; and exposing means for engraving an intaglio on said stamp-making portions of said stamp body by an exposure in accordance with said extended exposure time.

* * * * *